(12) United States Patent
Chen et al.

(10) Patent No.: US 10,697,661 B2
(45) Date of Patent: Jun. 30, 2020

(54) THERMAL CONTROL APPARATUS AND METHOD

(71) Applicant: Huawei Technologies Co., Ltd., Shenzhen, Guangdong (CN)

(72) Inventors: Wenjuan Chen, Shenzhen (CN); Wen Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 15/524,709

(22) PCT Filed: Nov. 6, 2014

(86) PCT No.: PCT/CN2014/090446
§ 371 (c)(1),
(2) Date: May 5, 2017

(87) PCT Pub. No.: WO2016/070376
PCT Pub. Date: May 12, 2016

(65) Prior Publication Data
US 2017/0321921 A1 Nov. 9, 2017

(51) Int. Cl.
*F24F 11/30* (2018.01)
*F24F 11/62* (2018.01)
(Continued)

(52) U.S. Cl.
CPC .............. *F24F 11/62* (2018.01); *F24F 11/30* (2018.01); *G05B 19/048* (2013.01); *G05D 23/00* (2013.01);
(Continued)

(58) Field of Classification Search
None
See application file for complete search history.

(56) References Cited

U.S. PATENT DOCUMENTS

| | | | |
|---|---|---|---|
| 8,392,340 B2 | 3/2013 | Cox et al. | |
| 8,775,832 B2 * | 7/2014 | Artman | G06F 1/206 713/300 |

(Continued)

FOREIGN PATENT DOCUMENTS

| | | | |
|---|---|---|---|
| CN | 101378418 A | 3/2009 | |
| CN | 101436091 A | 5/2009 | |

(Continued)

*Primary Examiner* — Jennifer L Norton
(74) *Attorney, Agent, or Firm* — Kilpatrick Townsend & Stockton LLP

(57) ABSTRACT

A thermal control apparatus and method are disclosed. The method includes: obtaining terminal status information of a terminal, where the terminal status information includes at least a terminal temperature parameter; obtaining environment status information and/or user status information, where the environment status information includes at least an environment temperature parameter and/or an environment humidity parameter, and the user status information includes at least one of a user body temperature parameter, a user electrocardiogram parameter, a user electroencephalogram parameter, or a user skin resistance parameter; and determining and executing a thermal control policy according to the terminal status information and either of or both of the environment status information and the user status information.

10 Claims, 8 Drawing Sheets

---

Obtain terminal status information of a terminal, where the terminal status information includes at least a terminal temperature parameter — 901

Obtain environment status information and/or user status information — 902

Determine, according to the terminal status information and either of or both of the environment status information and the user status information, a profile in which a user is — 903

Execute a thermal control policy corresponding to the profile, where the thermal control policy includes a terminal temperature control policy and/or an environment temperature control policy — 904

(51) Int. Cl.
*F24F 11/63* (2018.01)
*F24F 110/10* (2018.01)
*G05B 19/048* (2006.01)
*G05D 23/00* (2006.01)
*G05D 23/19* (2006.01)
*G06F 1/20* (2006.01)
*H04M 1/725* (2006.01)
*H04M 1/02* (2006.01)
*H04M 19/04* (2006.01)
*F24F 120/20* (2018.01)

(52) U.S. Cl.
CPC ..... *G05D 23/1917* (2013.01); *G05D 23/1927* (2013.01); *G06F 1/206* (2013.01); *H04M 1/02* (2013.01); *H04M 1/725* (2013.01); *H04M 19/04* (2013.01); *F24F 11/63* (2018.01); *F24F 2110/10* (2018.01); *F24F 2120/20* (2018.01); *G05B 2219/2614* (2013.01)

(56) References Cited

U.S. PATENT DOCUMENTS

| | | | |
|---|---|---|---|
| 9,304,520 | B2 | 4/2016 | Cheng et al. |
| 9,798,335 | B2* | 10/2017 | Poornachandran ..... G06F 1/206 |
| 2004/0065098 | A1 | 4/2004 | Choi et al. |
| 2004/0264124 | A1* | 12/2004 | Patel .................... G06F 1/20 |
| | | | 361/679.46 |
| 2006/0142968 | A1 | 6/2006 | Han et al. |
| 2006/0178764 | A1* | 8/2006 | Bieswanger ........... G06F 1/206 |
| | | | 700/89 |
| 2008/0077044 | A1 | 3/2008 | Nakayama et al. |
| 2009/0276062 | A1 | 11/2009 | Kanai et al. |
| 2010/0049995 | A1* | 2/2010 | Casey .................... G06F 1/206 |
| | | | 713/300 |
| 2010/0235012 | A1 | 9/2010 | Cox et al. |
| 2011/0303393 | A1 | 12/2011 | Senatori |
| 2012/0179416 | A1* | 7/2012 | Anderson ............... G06F 1/203 |
| | | | 702/130 |
| 2013/0102852 | A1 | 4/2013 | Kozloski et al. |
| 2013/0137946 | A1 | 5/2013 | Geske et al. |
| 2013/0289792 | A1 | 10/2013 | Cheng et al. |
| 2014/0118931 | A1 | 5/2014 | Hata |
| 2015/0057830 | A1* | 2/2015 | Slaby ................. G05D 23/1917 |
| | | | 700/300 |
| 2015/0124390 | A1* | 5/2015 | Koch .................... G06F 1/1633 |
| | | | 361/679.26 |
| 2017/0038806 | A1* | 2/2017 | Prajapati ................ G05B 15/02 |

FOREIGN PATENT DOCUMENTS

| | | |
|---|---|---|
| CN | 101917515 A | 12/2010 |
| CN | 201680551 U | 12/2010 |
| CN | 102745209 A | 10/2012 |
| CN | 102841615 A | 12/2012 |
| CN | 203432022 U | 2/2014 |
| JP | 2006246437 A | 9/2006 |
| JP | 2008075975 A | 4/2008 |
| JP | 2010072726 A | 4/2010 |
| JP | 2013213635 A | 10/2013 |
| JP | 2014090269 A | 5/2014 |
| WO | 2013033951 A1 | 3/2013 |
| WO | 2013069931 A1 | 5/2013 |

* cited by examiner

THERMAL CONTROL APPARATUS AND METHOD

CROSS REFERENCE TO RELATED APPLICATIONS

The present application claims priority under 35 U.S.C. § 365 to International Patent Application No. PCT/CN2014/090446 filed Nov. 6, 2014 which is incorporated herein by reference into the present disclosure as if fully set forth herein.

TECHNICAL FIELD

The present invention relates to the field of computer and Internet technologies, and in particular, to a thermal control apparatus and method.

BACKGROUND

Terminals such as a smartphone, a tablet computer, and a multimedia player already play an increasingly important role in daily work and lives of people.

To meet constantly increasing requirements of users, a designer greatly improves both performance and a structure of a terminal. In terms of the performance, the terminal has a higher computing processing capability, and supports more functions. In terms of the structure, a body of the terminal is designed to be increasingly slim, so that the terminal is more portable.

During implementation of the present invention, an inventor finds that the foregoing technology has at least the following problem: Because some components in an operating terminal generate heat, and the heat is transferred to a user by using a body housing that is in direct contact with the user, a thermal comfort level of the user is affected.

SUMMARY

To resolve a problem that heat generated by an operating terminal affects a thermal comfort level of a user, embodiments of the present invention provide a thermal control apparatus and method. The technical solutions are as follows:

According to a first aspect, a thermal control apparatus is provided, where the apparatus includes:

a first obtaining module, configured to obtain terminal status information of a terminal, where the terminal status information includes at least a terminal temperature parameter;

a second obtaining module, configured to obtain environment status information and/or user status information, where the environment status information includes at least an environment temperature parameter and/or an environment humidity parameter, and the user status information includes at least one of a user body temperature parameter, a user electrocardiogram parameter, a user electroencephalogram parameter, or a user skin resistance parameter; and a policy execution module, configured to determine and execute a thermal control policy according to the terminal status information and either of or both of the environment status information and the user status information, where the thermal control policy includes a terminal temperature control policy and/or an environment temperature control policy.

In a first possible implementation manner of the first aspect, the terminal status information further includes a charge and discharge status parameter and/or a usage status parameter.

With reference to the first aspect, in a second possible implementation manner of the first aspect, the second obtaining module includes:

an environment obtaining submodule, configured to obtain the environment status information by using an environment sensor, where the environment sensor is disposed in the terminal and/or a wearable device and/or a temperature control device, and the environment sensor includes at least a temperature sensor and/or a humidity sensor; and/or a user obtaining submodule, configured to obtain the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

With reference to the first aspect, the first possible implementation manner of the first aspect, or the second possible implementation manner of the first aspect, in a third possible implementation manner of the first aspect, the policy execution module includes: a mode determining submodule and a policy execution submodule, where the mode determining submodule is configured to determine, according to the terminal status information and either of or both of the environment status information and the user status information, a profile in which a user is; and the policy execution submodule is configured to execute a thermal control policy corresponding to the profile.

With reference to the third possible implementation manner of the first aspect, in a fourth possible implementation manner of the first aspect, the policy execution submodule includes: a first calculation unit and a first execution unit, where the first calculation unit is configured to: when the thermal control policy includes the terminal temperature control policy, calculate a thermal perception value according to the terminal status information, the profile, and a thermal perception value error item corresponding to the profile, where the thermal perception value error item is used to reflect a thermal perception difference between different users in the profile; and the first execution unit is configured to determine and execute the corresponding terminal temperature control policy according to the profile and the thermal perception value.

With reference to the fourth possible implementation manner of the first aspect, in a fifth possible implementation manner of the first aspect, the policy execution submodule further includes: a first recording unit and a first update unit, where the first recording unit is configured to: when the profile is V and the thermal perception value error item corresponding to the profile V is $\delta_v$, record a quantity K of times of executing the terminal temperature control policy, and a quantity K', in the quantity K of times for the terminal temperature control policy, of times for a terminal temperature control policy meeting a first predetermined condition, where the first predetermined condition refers to that the user generates a first predetermined reaction within first predetermined duration after the terminal temperature control policy takes effect; and the first update unit is configured to update the thermal perception value error item $\delta_v$ according to the quantity K of times for the terminal temperature control policy and the quantity K' of times for the terminal temperature control policy meeting the first predetermined condition.

With reference to the third possible implementation manner of the first aspect, in a sixth possible implementation manner of the first aspect, the policy execution submodule includes: a second calculation unit and a second execution unit, where the second calculation unit is configured to: when the thermal control policy includes the environment temperature control policy, calculate an expected environment temperature according to the terminal status information, the profile, and an expected environment temperature error item corresponding to the profile, where the expected environment temperature error item is used to reflect an environment temperature perception difference between different users in the profile; and the second execution unit is configured to determine and execute the environment temperature control policy according to the expected environment temperature.

With reference to the sixth possible implementation manner of the first aspect, in a seventh possible implementation manner of the first aspect, the policy execution submodule further includes: a second recording unit and a second update unit, where the second recording unit is configured to: when the profile is V and the expected environment temperature error item corresponding to the profile V is $\mu_v$, record a quantity M of times of executing the environment temperature control policy, and a quantity M', in the quantity M of times for the environment temperature control policy, of times for an environment temperature control policy meeting a second predetermined condition, where the second predetermined condition refers to that the user generates a second predetermined reaction within second predetermined duration after the environment temperature control policy takes effect; and the second update unit is configured to update the expected environment temperature error item according to the quantity M of times for the environment temperature control policy and the quantity M' of times for the environment temperature control policy meeting the second predetermined condition.

According to a second aspect, a thermal control apparatus is provided, where the apparatus includes: a bus, and a processor and a memory that are connected to the bus, where the memory is configured to store one or more instructions, and the instructions are configured to be executed by the processor;

the processor is configured to obtain terminal status information of a terminal, where the terminal status information includes at least a terminal temperature parameter;

the processor is further configured to obtain environment status information and/or user status infatuation, where the environment status infatuation includes at least an environment temperature parameter and/or an environment humidity parameter, and the user status infatuation includes at least one of a user body temperature parameter, a user electrocardiogram parameter, a user electroencephalogram parameter, or a user skin resistance parameter; and the processor is further configured to determine and execute a thermal control policy according to the terminal status information and either of or both of the environment status information and the user status information, where the thermal control policy includes a terminal temperature control policy and/or an environment temperature control policy.

In a first possible implementation manner of the second aspect, the terminal status information further includes a charge and discharge status parameter and/or a usage status parameter.

With reference to the second aspect, in a second possible implementation manner of the second aspect, the processor is further configured to obtain the environment status information by using an environment sensor, where the environment sensor is disposed in the terminal and/or a wearable device and/or a temperature control device, and the environment sensor includes at least a temperature sensor and/or a humidity sensor; and/or the processor is further configured to obtain the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

With reference to the second aspect, the first possible implementation manner of the second aspect, or the second possible implementation manner of the second aspect, in a third possible implementation manner of the second aspect, the processor is further configured to determine, according to the terminal status information and either of or both of the environment status information and the user status information, a profile in which a user is; and the processor is further configured to execute a thermal control policy corresponding to the profile.

With reference to the third possible implementation manner of the second aspect, in a fourth possible implementation manner of the second aspect, the processor is further configured to: when the thermal control policy includes the terminal temperature control policy, calculate a thermal perception value according to the terminal status information, the profile, and a thermal perception value error item corresponding to the profile, where the thermal perception value error item is used to reflect a thermal perception difference between different users in the profile; and the processor is further configured to determine and execute the corresponding terminal temperature control policy according to the profile and the thermal perception value.

With reference to the fourth possible implementation manner of the second aspect, in a fifth possible implementation manner of the second aspect, the processor is further configured to: when the profile is V and the thermal perception value error item corresponding to the profile V is $\delta_v$, record a quantity K of times of executing the terminal temperature control policy, and a quantity K', in the quantity K of times for the terminal temperature control policy, of times for a terminal temperature control policy meeting a first predetermined condition, where the first predetermined condition refers to that the user generates a first predetermined reaction within first predetermined duration after the terminal temperature control policy takes effect; and the processor is further configured to update the thermal perception value error item $\delta_v$ according to the quantity K of times for the terminal temperature control policy and the quantity K' of times for the terminal temperature control policy meeting the first predetermined condition.

With reference to the third possible implementation manner of the second aspect, in a sixth possible implementation manner of the second aspect, the processor is further configured to: when the thermal control policy includes the environment temperature control policy, calculate an expected environment temperature according to the terminal status information, the profile, and an expected environment temperature error item corresponding to the profile, where the expected environment temperature error item is used to reflect an environment temperature perception difference between different users in the profile; and the processor is further configured to determine and execute the environment temperature control policy according to the expected environment temperature.

With reference to the sixth possible implementation manner of the second aspect, in a seventh possible implementation manner of the second aspect, the processor is further configured to: when the profile is V and the expected environment temperature error item corresponding to the profile V is $\mu_v$, record a quantity M of times of executing the environment temperature control policy, and a quantity M', in the quantity M of times for the environment temperature control policy, of times for an environment temperature control policy meeting a second predetermined condition, where the second predetermined condition refers to that the user generates a second predetermined reaction within second predetermined duration after the environment temperature control policy takes effect; and the processor is further configured to update the expected environment temperature error item $\mu_v$ according to the quantity M of times for the environment temperature control policy and the quantity M' of times for the environment temperature control policy meeting the second predetermined condition.

According to a third aspect, a thermal control method is provided, where the method includes:

obtaining terminal status information of a terminal, where the terminal status information includes at least a terminal temperature parameter;

obtaining environment status information and/or user status information, where the environment status information includes at least an environment temperature parameter and/or an environment humidity parameter, and the user status information includes at least one of a user body temperature parameter, a user electrocardiogram parameter, a user electroencephalogram parameter, or a user skin resistance parameter; and determining and executing a thermal control policy according to the terminal status information and either of or both of the environment status information and the user status information, where the thermal control policy includes a terminal temperature control policy and/or an environment temperature control policy.

In a first possible implementation manner of the third aspect, the terminal status information further includes a charge and discharge status parameter and/or a usage status parameter.

With reference to the third aspect, in a second possible implementation manner of the third aspect, the obtaining environment status information and/or user status information includes:

obtaining the environment status information by using an environment sensor, where the environment sensor is disposed in the terminal and/or a wearable device and/or a temperature control device, and the environment sensor includes at least a temperature sensor and/or a humidity sensor; and/or obtaining the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

With reference to the third aspect, the first possible implementation manner of the third aspect, or the second possible implementation manner of the third aspect, in a third possible implementation manner of the third aspect, the determining and executing a thermal control policy according to the terminal status information and either of or both of the environment status information and the user status information includes:

determining, according to the terminal status information and either of or both of the environment status information and the user status information, a profile in which a user is; and executing a thermal control policy corresponding to the profile.

With reference to the third possible implementation manner of the third aspect, in a fourth possible implementation manner of the third aspect, the executing the thermal control policy corresponding to the profile includes:

when the thermal control policy includes the terminal temperature control policy, calculating a thermal perception value according to the terminal status information, the profile, and a thermal perception value error item corresponding to the profile, where the thermal perception value error item is used to reflect a thermal perception difference between different users in the profile; and determining and executing the corresponding terminal temperature control policy according to the profile and the thermal perception value.

With reference to the fourth possible implementation manner of the third aspect, in a fifth possible implementation manner of the third aspect, the method further includes:

when the profile is V and the thermal perception value error item corresponding to the profile V is $\delta_v$, recording a quantity K of times of executing the terminal temperature control policy, and a quantity K', in the quantity K of times for the terminal temperature control policy, of times for a terminal temperature control policy meeting a first predetermined condition, where the first predetermined condition refers to that the user generates a first predetermined reaction within first predetermined duration after the terminal temperature control policy takes effect; and updating the thermal perception value error item $\delta_v$ according to the quantity K of times for the terminal temperature control policy and the quantity IC of times for the terminal temperature control policy meeting the first predetermined condition.

With reference to the third possible implementation manner of the third aspect, in a sixth possible implementation manner of the third aspect, the executing the thermal control policy corresponding to the profile includes:

when the thermal control policy includes the environment temperature control policy, calculating an expected environment temperature according to the terminal status information, the profile, and an expected environment temperature error item corresponding to the profile, where the expected environment temperature error item is used to reflect an environment temperature perception difference between different users in the profile; and determining and executing the environment temperature control policy according to the expected environment temperature.

With reference to the sixth possible implementation manner of the third aspect, in a seventh possible implementation manner of the third aspect, the method further includes:

when the profile is V and the expected environment temperature error item corresponding to the profile V is $\mu_v$, recording a quantity M of times of executing the environment temperature control policy, and a quantity M', in the quantity M of times for the environment temperature control policy, of times for an environment temperature control policy meeting a second predetermined condition, where the second predetermined condition refers to that the user generates a second predetermined reaction within second predetermined duration after the environment temperature control policy takes effect; and updating the expected environment temperature error item $\mu_v$ according to the quantity M of times for the environment temperature control policy and the quantity M' of times for the environment temperature control policy meeting the second predetermined condition.

The technical solutions provided in the embodiments of the present invention may have the following beneficial effects:

Terminal status information including a terminal temperature parameter is obtained, environment status information and/or user status information are/is obtained, and a thermal control policy is then determined and executed according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

Optionally, a scenario in which the user is actually located is further simulated from different perspectives of a terminal status, an environment status, and a user status by setting different profiles, the thermal perception of the user is learned, and a reason for affecting the thermal comfort level of the user is learned, which facilitates targeted selection of the thermal control policy, and improves efficiency and accuracy of thermal control.

Optionally, a temperature of the terminal is further adjusted and controlled by using a terminal temperature control policy, which improves a local thermal comfort level of the user, so that performance of the terminal and the local thermal comfort level of the user are balanced. An environment temperature is further adjusted and controlled by using an environment temperature control policy, which further improves an entire thermal comfort level of the user.

Optionally, a thermal perception value error item and/or an expected environment temperature error item are/is further updated in real time, regularly, or irregularly according to a reaction of the user to the thermal control policy, so that the foregoing parameters can more accurately reflect a thermal perception difference between different users in a corresponding profile, thereby meeting a personalized thermal comfort requirement of the user.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1:
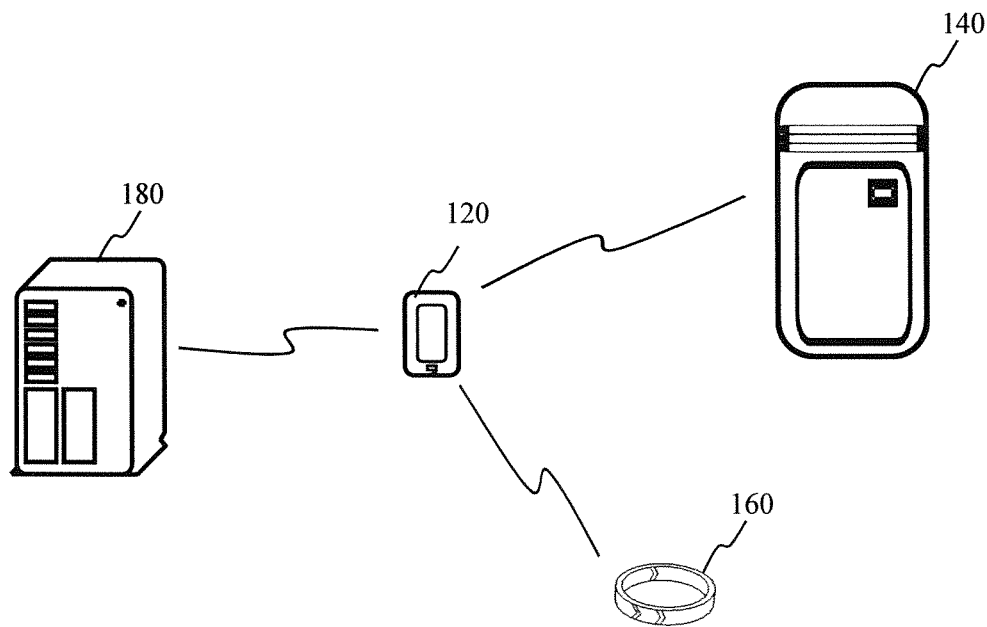
FIG. 1 is a schematic structural diagram of an implementation environment in each embodiment of the present invention.

Referring to FIG. 1, FIG. 1 is a schematic structural diagram of an implementation environment in each embodiment of the present invention. The implementation environment may include: a terminal 120 and temperature control device 140.

The terminal 120 may be a mobile terminal or a portable electronic device, such as a mobile phone, a tablet computer, an ebook reader, a personal digital assistant (English: Personal Digital Assistant, PDA for short), or a laptop portable computer. A temperature sensor may be disposed in the terminal 120, and is configured to collect a temperature of a terminal surface with which a user is in contact.

The terminal 120 is connected to the temperature control device 140 in a wireless connection manner. The wireless connection manner may be an infrared connection or may be a wireless network connection.

The temperature control device 140 may be one temperature control device, for example, an intelligent air conditioner; or may be a temperature control device cluster, for example, an intelligent constant temperature system, including multiple temperature control devices. The temperature control device 140 is configured to adjust an environment temperature. An environment sensor may be disposed in the temperature control device 140, and the environment sensor may include a temperature sensor and/or a humidity sensor. The temperature sensor is configured to collect a temperature of an environment in which the user is located, and the humidity sensor is configured to collect humidity of the environment in which the user is located.

Optionally, the implementation environment may further include: a wearable device 160.

The wearable device 160 may be connected to the terminal 120 and/or the temperature control device 140 by using a wireless network. The wearable device 160 may be a smart watch, a smart band, a smart helmet, or the like. A biosensor may be disposed in the wearable device 160. The biosensor is configured to collect a parameter related to physiology of the user, and the biosensor may include at least one of a body temperature sensor, an electrocardiogram sensor, an electroencephalogram sensor, or a skin resistance sensor.

Optionally, the implementation environment may further include a server 180.

The server 180 may be connected to one or more of the terminal 120, the temperature control device 140, or the wearable device 160 by using the wireless network. The server 180 may be one server, may be a server cluster including multiple servers, or may be a cloud computing service center.

In addition, the sensors included in the foregoing devices are merely exemplary. In an actual application, different sensors may be disposed in different devices according to an actual requirement.

Figure 2:
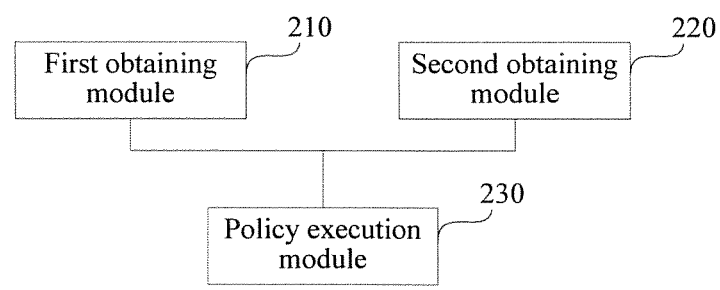
FIG. 2 is a structural block diagram of a thermal control apparatus according to an embodiment of the present invention.

Referring to FIG. 2, FIG. 2 is a structural block diagram of a thermal control apparatus according to an embodiment of the present invention. In this embodiment, an example in which the thermal control apparatus is applied to the implementation environment shown in FIG. 1 is used for description. In a possible implementation manner, the thermal control apparatus may be implemented, by using software, hardware, or a combination thereof, as a part or all of the terminal in the implementation environment shown in FIG. 1. The thermal control apparatus may include: a first obtaining module 210, a second obtaining module 220, and a policy execution module 230.

The first obtaining module 210 is configured to obtain terminal status information of the terminal. The terminal status information includes at least a terminal temperature parameter.

The second obtaining module 220 is configured to obtain environment status information and/or user status information. The environment status information includes at least an environment temperature parameter and/or an environment humidity parameter, and the user status information includes at least one of a user body temperature parameter, a user electrocardiogram parameter, a user electroencephalogram parameter, or a user skin resistance parameter.

The policy execution module 230 is configured to determine and execute a thermal control policy according to the terminal status information and either of or both of the environment status information and the user status information, where the thermal control policy includes a terminal temperature control policy and/or an environment temperature control policy.

To sum up, the thermal control apparatus provided in this embodiment obtains terminal status information including a terminal temperature parameter, obtains environment status information and/or user status information, and then determines and executes a thermal control policy according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

Figure 3:
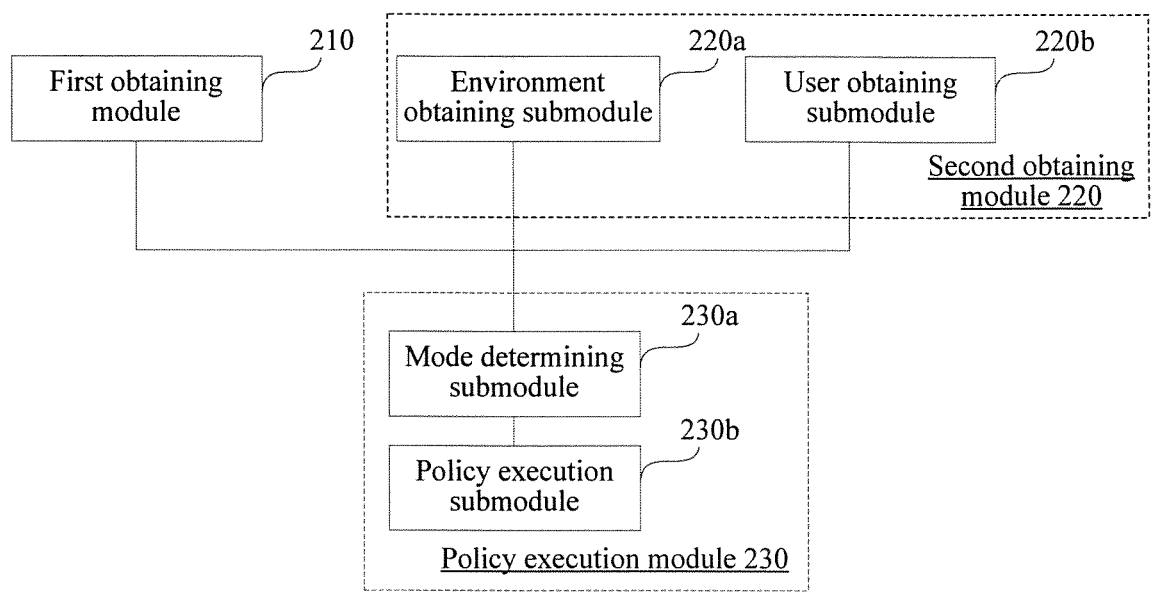
FIG. 3 is a structural block diagram of a thermal control apparatus according to another embodiment of the present invention.

Referring to FIG. 3, FIG. 3 is a structural block diagram of a thermal control apparatus according to another embodiment of the present invention. In this embodiment, an example in which the thermal control apparatus is applied to the implementation environment shown in FIG. 1 is used for description. In a possible implementation manner, the thermal control apparatus may be implemented, by using software, hardware, or a combination thereof, as a part or all of the terminal in the implementation environment shown in FIG. 1. The thermal control apparatus may include: a first obtaining module 210, a second obtaining module 220, and a policy execution module 230.

The first obtaining module 210 is configured to obtain terminal status information of the terminal. The terminal status information includes at least a terminal temperature parameter.

Optionally, the terminal status information further includes a charge and discharge status parameter and/or a usage status parameter.

The second obtaining module 220 is configured to obtain environment status information and/or user status information. The environment status information includes at least an environment temperature parameter and/or an environment humidity parameter, and the user status information includes at least one of a user body temperature parameter, a user electrocardiogram parameter, a user electroencephalogram parameter, or a user skin resistance parameter.

In a possible implementation manner, the second obtaining module 220 includes: an environment obtaining submodule 220a and/or a user obtaining submodule 220b.

The environment obtaining submodule 220a is configured to obtain the environment status information by using an environment sensor, where the environment sensor is disposed in the terminal and/or a wearable device and/or a temperature control device, and the environment sensor includes at least a temperature sensor and/or a humidity sensor.

The user obtaining submodule 220b is configured to obtain the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

The policy execution module 230 is configured to determine and execute a thermal control policy according to the terminal status information and either of or both of the environment status information and the user status information, where the thermal control policy includes a terminal temperature control policy and/or an environment temperature control policy.

Specifically, the policy execution module 230 includes: a mode determining submodule 230a and a policy execution submodule 230b.

The mode determining submodule 230a is configured to determine, according to the terminal status information and either of or both of the environment status information and the user status information, a profile in which a user is.

The policy execution submodule 230b is configured to execute a thermal control policy corresponding to the profile.

To sum up, the thermal control apparatus provided in this embodiment obtains terminal status information including a terminal temperature parameter, obtains environment status information and/or user status information, and then determines and executes a thermal control policy according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

In addition, by means of the thermal control apparatus provided in this embodiment, a scenario in which the user is actually located is further simulated from different perspectives of a terminal status, an environment status, and a user status by setting different profiles, the thermal perception of the user is learned, and a reason for affecting the thermal comfort level of the user is learned, which facilitates targeted selection of the thermal control policy, and improves efficiency and accuracy of thermal control.

In addition, the thermal control apparatus provided in this embodiment further adjusts and controls a temperature of the terminal by using a terminal temperature control policy, which improves a local thermal comfort level of the user, so that performance of the terminal and the local thermal comfort level of the user are balanced. The thermal control apparatus further adjusts and controls an environment temperature by using an environment temperature control policy, which further improves an entire thermal comfort level of the user.

Figure 4:
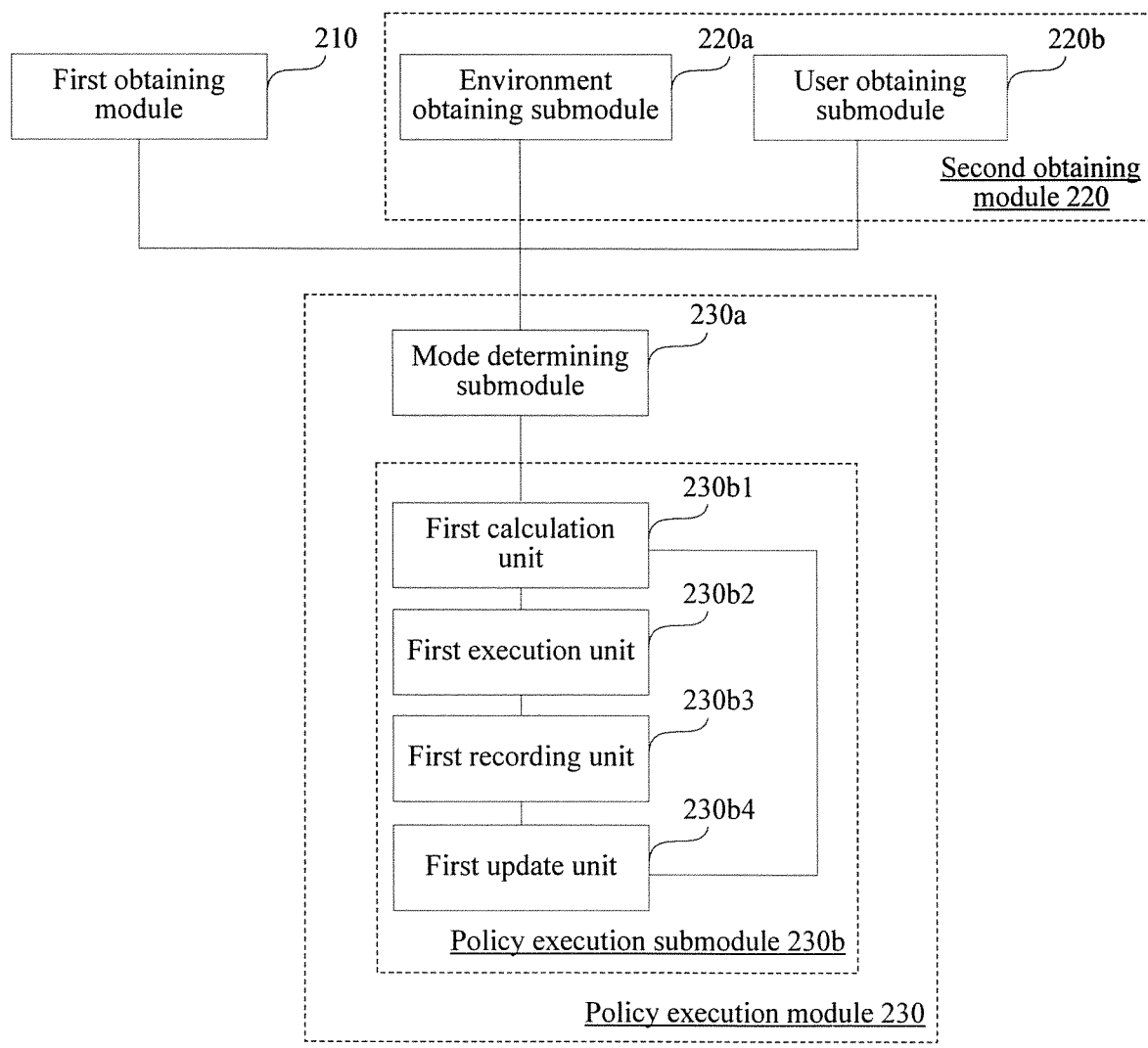
FIG. 4 is a structural block diagram of a thermal control apparatus according to still another embodiment of the present invention.

Referring to FIG. 4, FIG. 4 is a structural block diagram of a thermal control apparatus according to still another embodiment of the present invention. In this embodiment, an example in which the thermal control apparatus is applied to the implementation environment shown in FIG. 1 is used for description. In a possible implementation manner, the thermal control apparatus may be implemented, by using software, hardware, or a combination thereof, as a part or all of the terminal in the implementation environment shown in FIG. 1. The thermal control apparatus may include: a first obtaining module 210, a second obtaining module 220, and a policy execution module 230.

The first obtaining module 210 is configured to obtain terminal status information of the terminal. The terminal status information includes at least a terminal temperature parameter.

Optionally, the terminal status information further includes a charge and discharge status parameter and/or a usage status parameter.

The second obtaining module 220 is configured to obtain environment status information and/or user status information. The environment status information includes at least an environment temperature parameter and/or an environment humidity parameter, and the user status information includes at least one of a user body temperature parameter, a user electrocardiogram parameter, a user electroencephalogram parameter, or a user skin resistance parameter.

In a possible implementation manner, the second obtaining module 220 includes: an environment obtaining submodule 220a and/or a user obtaining submodule 220b.

The environment obtaining submodule 220a is configured to obtain the environment status information by using an environment sensor, where the environment sensor is disposed in the terminal and/or a wearable device and/or a temperature control device, and the environment sensor includes at least a temperature sensor and/or a humidity sensor.

The user obtaining submodule 220b is configured to obtain the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

The policy execution module 230 is configured to determine and execute a thermal control policy according to the terminal status information and either of or both of the environment status information and the user status information, where the thermal control policy includes a terminal temperature control policy and/or an environment temperature control policy.

Specifically, the policy execution module 230 includes: a mode determining submodule 230a and a policy execution submodule 230b.

The mode determining submodule 230a is configured to determine, according to the terminal status information and either of or both of the environment status information and the user status information, a profile in which a user is.

The policy execution submodule 230b is configured to execute a thermal control policy corresponding to the profile.

In a possible implementation manner, the policy execution submodule 230b includes: a first calculation unit 230b1 and a first execution unit 230b2.

The first calculation unit 230b1 is configured to: when the thermal control policy includes the terminal temperature control policy, calculate a thermal perception value according to the terminal status information, the profile, and a thermal perception value error item corresponding to the profile, where the thermal perception value error item is used to reflect a thermal perception difference between different users in the profile.

The first execution unit 230b2 is configured to determine and execute the corresponding terminal temperature control policy according to the profile and the thermal perception value.

Optionally, the policy execution submodule 230b further includes: a first recording unit 230b3 and a first update unit 230b4.

The first recording unit 230b3 is configured to: when the profile is V and the thermal perception value error item corresponding to the profile V is $\delta_V$, record a quantity K of times of executing the terminal temperature control policy, and a quantity K', in the quantity K of times for the terminal temperature control policy, of times for a terminal temperature control policy meeting a first predetermined condition, where the first predetermined condition refers to that the user generates a first predetermined reaction within first predetermined duration after the terminal temperature control policy takes effect.

The first update unit 230b4 is configured to update the thermal perception value error item $\delta_V$ according to the quantity K of times for the terminal temperature control policy and the quantity K' of times for the terminal temperature control policy meeting the first predetermined condition.

To sum up, the thermal control apparatus provided in this embodiment obtains terminal status information including a terminal temperature parameter, obtains environment status information and/or user status information, and then determines and executes a thermal control policy according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

In addition, the thermal control apparatus provided in this embodiment further updates a thermal perception value error item in real time, regularly, or irregularly according to a reaction of the user to a terminal temperature control policy, so that the thermal perception value error item can more accurately reflect a thermal perception difference between different users in a corresponding profile, thereby meeting a personalized thermal comfort requirement of the user.

Figure 5:
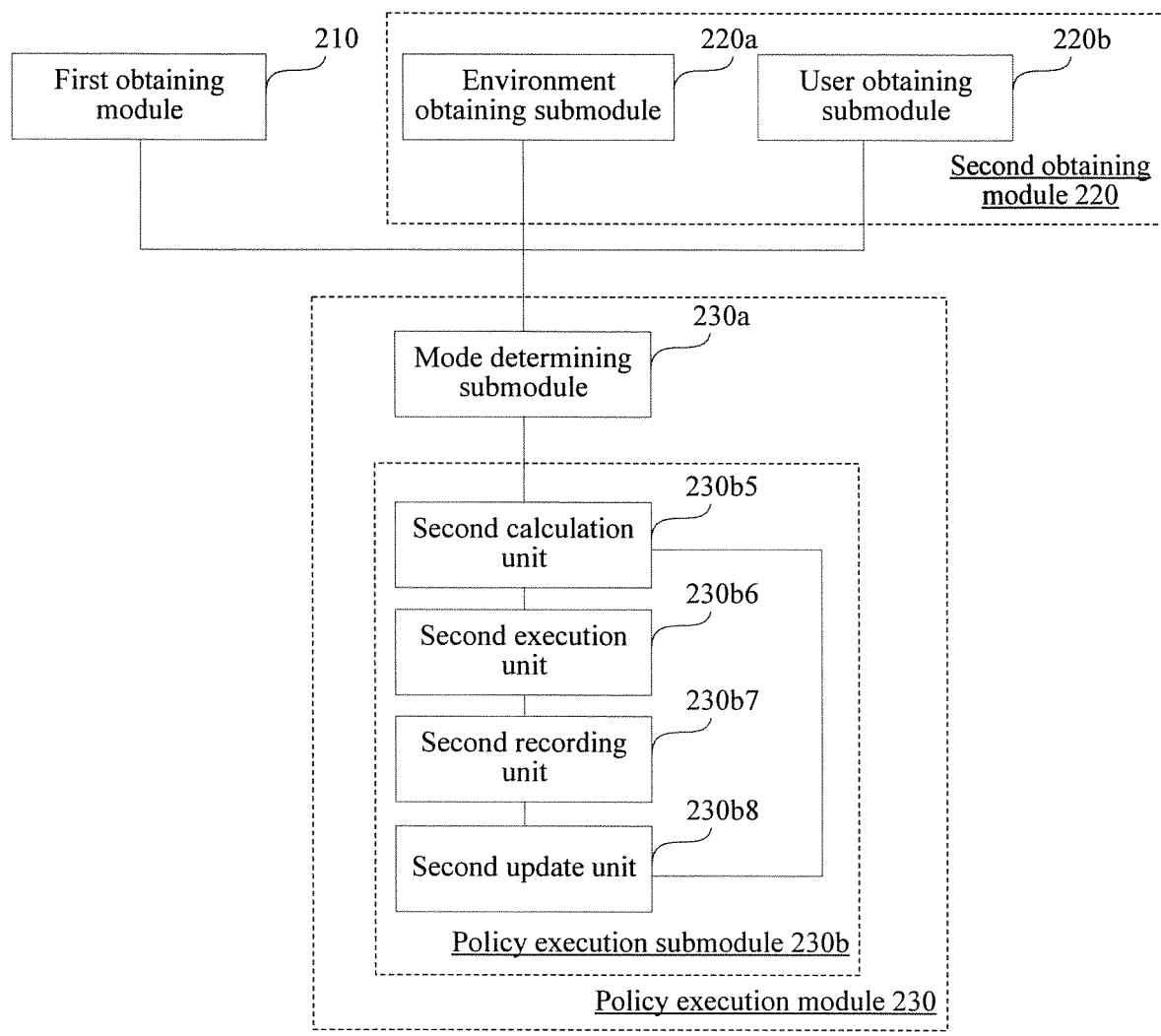
FIG. 5 is a structural block diagram of a thermal control apparatus according to yet another embodiment of the present invention.

Referring to FIG. 5, FIG. 5 is a structural block diagram of a thermal control apparatus according to yet another embodiment of the present invention. In this embodiment, an example in which the thermal control apparatus is applied to the implementation environment shown in FIG. 1 is used for description. In a possible implementation manner, the thermal control apparatus may be implemented, by using software, hardware, or a combination thereof, as a part or all of the terminal in the implementation environment shown in FIG. 1. The thermal control apparatus may include: a first obtaining module 210, a second obtaining module 220, and a policy execution module 230.

The first obtaining module 210 is configured to obtain terminal status information of the terminal. The terminal status information includes at least a terminal temperature parameter.

Optionally, the terminal status information further includes a charge and discharge status parameter and/or a usage status parameter.

The second obtaining module 220 is configured to obtain environment status information and/or user status information. The environment status information includes at least an environment temperature parameter and/or an environment humidity parameter, and the user status information includes at least one of a user body temperature parameter, a user electrocardiogram parameter, a user electroencephalogram parameter, or a user skin resistance parameter.

In a possible implementation manner, the second obtaining module 220 includes: an environment obtaining submodule 220a and/or a user obtaining submodule 220b.

The environment obtaining submodule 220a is configured to obtain the environment status information by using an environment sensor, where the environment sensor is disposed in the terminal and/or a wearable device and/or a temperature control device, and the environment sensor includes at least a temperature sensor and/or a humidity sensor.

The user obtaining submodule 220b is configured to obtain the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

The policy execution module 230 is configured to determine and execute a thermal control policy according to the terminal status information and either of or both of the environment status information and the user status information, where the thermal control policy includes a terminal temperature control policy and/or an environment temperature control policy.

Specifically, the policy execution module 230 includes: a mode determining submodule 230a and a policy execution submodule 230b.

The mode determining submodule 230a is configured to determine, according to the terminal status information and either of or both of the environment status information and the user status information, a profile in which a user is.

The policy execution submodule 230b is configured to execute a thermal control policy corresponding to the profile.

Different from the embodiment shown in FIG. 4, in another possible implementation manner, the policy execution submodule 230b includes: a second calculation unit 230b5 and a second execution unit 230b6.

The second calculation unit 230b5 is configured to: when the thermal control policy includes the environment temperature control policy, calculate an expected environment temperature according to the terminal status information, the profile, and an expected environment temperature error item corresponding to the profile, where the expected environment temperature error item is used to reflect an environment temperature perception difference between different users in the profile.

The second execution unit 230b6 is configured to determine and execute the environment temperature control policy according to the expected environment temperature.

Optionally, the policy execution submodule 230b further includes: a second recording unit 230b7 and a second update unit 230b8.

The second recording unit 230b7 is configured to: when the profile is V and the expected environment temperature error item corresponding to the profile V is $\mu_v$, record a quantity M of times of executing the environment temperature control policy, and a quantity M', in the quantity M of times for the environment temperature control policy, of times for an environment temperature control policy meeting a second predetermined condition, where the second predetermined condition refers to that the user generates a second predetermined reaction within second predetermined duration after the environment temperature control policy takes effect.

The second update unit 230b8 is configured to update the expected environment temperature error item $\mu_v$ according to the quantity M of times for the environment temperature control policy and the quantity M' of times for the environment temperature control policy meeting the second predetermined condition.

To sum up, the thermal control apparatus provided in this embodiment obtains terminal status information including a terminal temperature parameter, obtains environment status information and/or user status information, and then determines and executes a thermal control policy according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

In addition, the thermal control apparatus provided in this embodiment further updates an expected environment temperature error item in real time, regularly, or irregularly according to a reaction of the user to an environment temperature control policy, so that the expected environment temperature error item can more accurately reflect an environment temperature perception difference between different users in a corresponding profile, thereby meeting a personalized thermal comfort requirement of the user.

It should be noted that, function modules configured to execute the terminal temperature control policy and function modules configured to execute the environment temperature control policy are respectively described in the embodiments shown in FIG. 4 and FIG. 5 by using examples. In an actual application, the thermal control apparatus may include only the function modules configured to execute the terminal temperature control policy, or may include only the function modules configured to execute the environment temperature control policy, or may include both the function modules configured to execute the terminal temperature control policy and the function modules configured to execute the environment temperature control policy, which is not specifically limited.

It should be further noted that, in the thermal control apparatuses provided in the embodiments shown in FIG. 2, FIG. 3, FIG. 4, and FIG. 5, the thermal control apparatus may be independently implemented, by using software, hardware, or a combination thereof, as a part or all of a device in the implementation environment shown in FIG. 1. For example, the thermal control apparatus may be implemented, by using software, hardware, or a combination thereof, as a part or all of the terminal in the implementation environment shown in FIG. 1. Alternatively, the thermal control apparatus may be implemented, by using software, hardware, or a combination thereof, as a part or all of two or more devices in the implementation environment shown in FIG. 1. For example, some function modules are implemented as a part or all of the terminal by using software, hardware, or a combination thereof, and the other function modules are implemented as a part or all of the server by using software, hardware, or a combination thereof. In an actual application, different function modules may be configured in different devices according to an actual requirement, and an entire thermal control solution is implemented by means of interaction and cooperation between devices.

Figure 6:
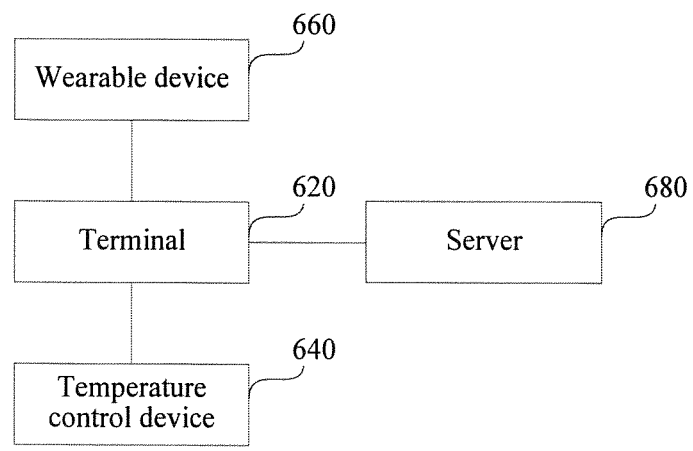
FIG. 6 is a schematic structural diagram of a thermal control system according to an embodiment of the present invention.

Referring to FIG. 6, FIG. 6 is a schematic structural diagram of a thermal control system according to an embodiment of the present invention. The thermal control system includes: a terminal 620 and a temperature control device 640.

The terminal 620 is connected to the temperature control device 640 in a wireless connection manner. The wireless connection manner may be an infrared connection or may be a wireless network connection.

Optionally, the thermal control system may further include: a wearable device 660.

The wearable device 660 may be connected to the terminal 620 and/or the temperature control device 640 by using a wireless network.

Optionally, the thermal control system may further include: a server 680.

The server 680 may be connected to one or more of the terminal 620, the temperature control device 640, or the wearable device 660 by using the wireless network.

The terminal 620 may include all or some function modules in the thermal control apparatus provided in the embodiment shown in FIG. 2, FIG. 3, FIG. 4, or FIG. 5. When the terminal 620 includes some function modules in the thermal control apparatus provided in the embodiment shown in FIG. 2, FIG. 3, FIG. 4, or FIG. 5, the other function modules may be integrated into one or more devices of the temperature control device 640, the wearable device 660, or the server 680 by using software, hardware, or a combination thereof.

To sum up, the thermal control system provided in this embodiment obtains terminal status information including a terminal temperature parameter, obtains environment status information and/or user status information, and then determines and executes a thermal control policy according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

It should be further noted that, when the thermal control apparatus and system provided in the embodiments perform thermal control operations, only division of the function modules is described by using an example. In an actual application, the foregoing functions may be allocated to and completed by different function modules as required, that is, an internal structure of the device is divided into different function modules, to complete all or some of the functions described above. In addition, the thermal control apparatus and system that are provided in the embodiments and the method embodiment of the thermal control method belong to a same concept. For specific implementation processes thereof, refer to the method embodiments, and details are not described herein again.

Figure 7:
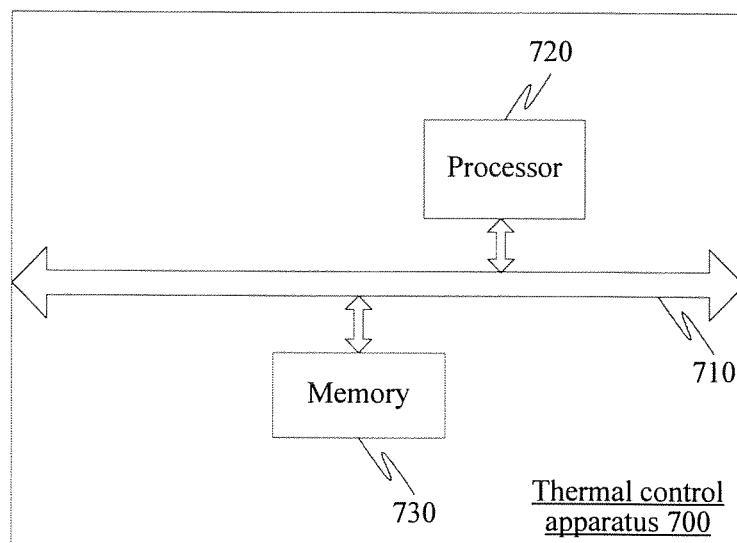
FIG. 7 is a schematic structural diagram of a thermal control apparatus according to still yet another embodiment of the present invention.

Referring to FIG. 7, FIG. 7 is a schematic structural diagram of a thermal control apparatus according to still yet another embodiment of the present invention. The thermal control apparatus may be independently applied to the terminal in the implementation environment shown in FIG. 1, or may be applied to two or more devices in the implementation environment shown in FIG. 1. The thermal control apparatus 700 includes: a bus 710, a processor 720, and a memory 730 that are connected to the bus 710. The memory 730 is configured to store one or more instructions, where the instructions are configured to be executed by the processor 720.

The processor 720 is configured to obtain terminal status information of the terminal. The terminal status information includes at least a terminal temperature parameter.

The processor 720 is further configured to obtain environment status information and/or user status information. The environment status information includes at least an environment temperature parameter and/or an environment humidity parameter, and the user status information includes at least one of a user body temperature parameter, a user electrocardiogram parameter, a user electroencephalogram parameter, or a user skin resistance parameter.

The processor 720 is further configured to determine and execute a thermal control policy according to the terminal status information and either of or both of the environment status information and the user status information, where the thermal control policy includes a terminal temperature control policy and/or an environment temperature control policy.

To sum up, the thermal control apparatus provided in this embodiment obtains terminal status information including a terminal temperature parameter, obtains environment status information and/or user status information, and then determines and executes a thermal control policy according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

In an optional embodiment provided based on the embodiment shown in FIG. 7, the terminal status information further includes a charge and discharge status parameter and/or a usage status parameter.

In an optional embodiment provided based on the embodiment shown in FIG. 7, the processor 720 is further configured to obtain the environment status information by using an environment sensor, where the environment sensor is disposed in the terminal and/or a wearable device and/or a temperature control device, and the environment sensor includes at least a temperature sensor and/or a humidity sensor; and/or the processor 720 is further configured to obtain the user status information by using a biosensor, where the biosensor is disposed in the terminal and/or the wearable device, and the biosensor includes at least one of a body temperature sensor, an electrocardiogram sensor, an electroencephalogram sensor, or a skin resistance sensor.

In an optional embodiment provided based on the embodiment shown in FIG. 7, the processor 720 is further configured to determine, according to the terminal status information and either of or both of the environment status information and the user status information, a profile in which a user is; and the processor 720 is further configured to execute a thermal control policy corresponding to the profile.

In an optional embodiment provided based on the embodiment shown in FIG. 7, the processor 720 is further configured to: when the thermal control policy includes the terminal temperature control policy, calculate a thermal perception value according to the terminal status information, the profile, and a thermal perception value error item corresponding to the profile, where the thermal perception value error item is used to reflect a thermal perception difference between different users in the profile; and the processor 720 is further configured to determine and execute the corresponding terminal temperature control policy according to the profile and the thermal perception value.

In an optional embodiment provided based on the embodiment shown in FIG. 7, the processor 720 is further configured to: when the profile is V and the thermal perception value error item corresponding to the profile V is $\delta_v$, record a quantity K of times of executing the terminal temperature control policy, and a quantity K', in the quantity K of times for the terminal temperature control policy, of times for a terminal temperature control policy meeting a first predetermined condition, where the first predetermined condition refers to that the user generates a first predetermined reaction within first predetermined duration after the terminal temperature control policy takes effect; and the processor 720 is further configured to update the thermal perception value error item $\delta_v$ according to the quantity K of times for the terminal temperature control policy and the quantity K' of times for the terminal temperature control policy meeting the first predetermined condition.

In an optional embodiment provided based on the embodiment shown in FIG. 7, the processor 720 is further configured to: when the thermal control policy includes the environment temperature control policy, calculate an expected environment temperature according to the terminal status information, the profile, and an expected environment temperature error item corresponding to the profile, where the expected environment temperature error item is used to reflect an environment temperature perception difference between different users in the profile; and the processor 720 is further configured to determine and execute the environment temperature control policy according to the expected environment temperature.

In an optional embodiment provided based on the embodiment shown in FIG. 7, the processor 720 is further configured to: when the profile is V and the expected environment temperature error item corresponding to the profile V is $\mu_v$, record a quantity M of times of executing the environment temperature control policy, and a quantity M', in the quantity M of times for the environment temperature control policy, of times for an environment temperature control policy meeting a second predetermined condition, where the second predetermined condition refers to that the user generates a second predetermined reaction within sec-ond predetermined duration after the environment temperature control policy takes effect; and the processor 720 is further configured to update the expected environment temperature error item $\mu_v$, according to the quantity M of times for the environment temperature control policy and the quantity M' of times for the environment temperature control policy meeting the second predetermined condition.

Optionally, by means of the thermal control apparatus provided in this embodiment, a scenario in which the user is actually located is further simulated from different perspectives of a terminal status, an environment status, and a user status by setting different profiles, the thermal perception of the user is learned, and a reason for affecting the thermal comfort level of the user is learned, which facilitates targeted selection of the thermal control policy, and improves efficiency and accuracy of thermal control.

Optionally, the thermal control apparatus provided in this embodiment further adjusts and controls a temperature of the terminal by using a terminal temperature control policy, which improves a local thermal comfort level of the user, so that performance of the terminal and the local thermal comfort level of the user are balanced. The thermal control apparatus further adjusts and controls an environment temperature by using an environment temperature control policy, which further improves an entire thermal comfort level of the user.

Optionally, a thermal perception value error item and/or an expected environment temperature error item are/is further updated in real time, regularly, or irregularly according to a reaction of the user to the thermal control policy, so that the foregoing parameters can more accurately reflect a thermal perception difference between different users in a corresponding profile, thereby meeting a personalized thermal comfort requirement of the user.

Method embodiments of the present invention are as follows, and the method embodiments correspond to the foregoing apparatus embodiments. For undisclosed details of the apparatus embodiments of the present invention, refer to the method embodiments of the present invention.

Figure 8:
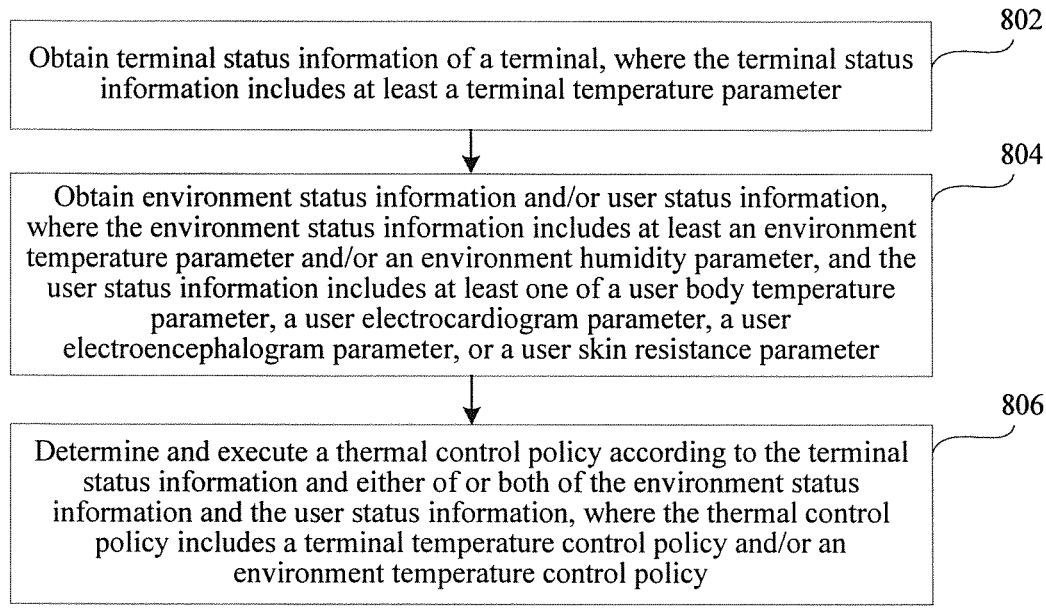
FIG. 8 is a method flowchart of a thermal control method according to an embodiment of the present invention.

Referring to FIG. 8, FIG. 8 is a method flowchart of a thermal control method according to an embodiment of the present invention. In this embodiment, an example in which the thermal control method is applied to the implementation environment shown in FIG. 1 is used for description. The thermal control method may include the following several steps:

Step 802: Obtain terminal status information of a terminal, where the terminal status information includes at least a terminal temperature parameter.

Step 804: Obtain environment status information and/or user status information, where the environment status information includes at least an environment temperature parameter and/or an environment humidity parameter, and the user status information includes at least one of a user body temperature parameter, a user electrocardiogram parameter, a user electroencephalogram parameter, or a user skin resistance parameter.

Step 806: Determine and execute a thermal control policy according to the terminal status information and either of or both of the environment status information and the user status information, where the thermal control policy includes a terminal temperature control policy and/or an environment temperature control policy.

To sum up, by means of the thermal control method provided in this embodiment, terminal status information including a terminal temperature parameter is obtained, environment status information and/or user status information are/is obtained, and a thermal control policy is then determined and executed according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

Figure 9:
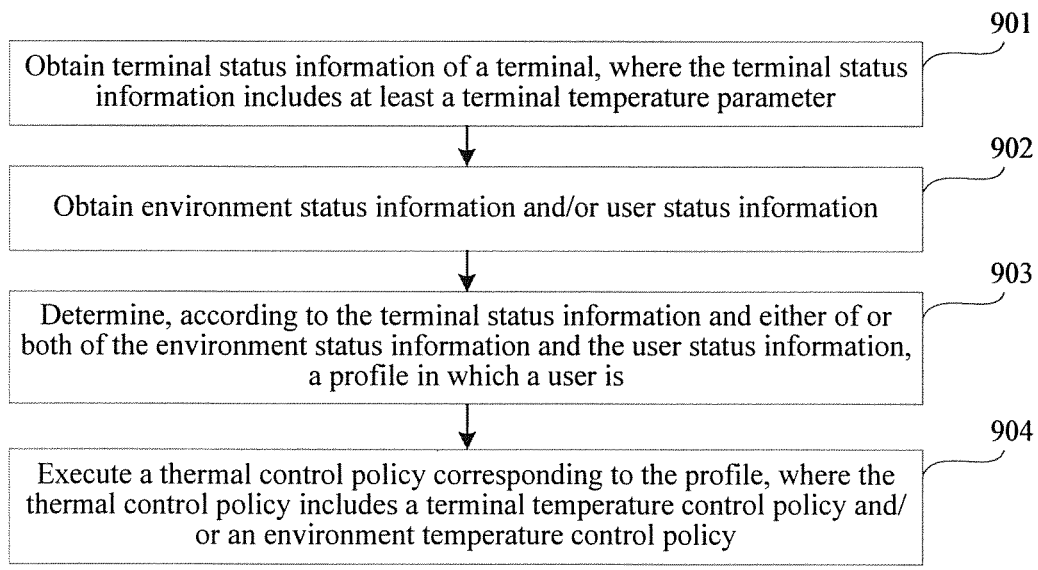
FIG. 9 is a method flowchart of a thermal control method according to another embodiment of the present invention.

Referring to FIG. 9, FIG. 9 is a method flowchart of a thermal control method according to another embodiment of the present invention. In this embodiment, an example in which the thermal control method is applied to the implementation environment shown in FIG. 1 is used for description. The thermal control method may include the following several steps:

Step 901: Obtain terminal status information of a terminal, where the terminal status information includes at least a terminal temperature parameter.

The terminal temperature parameter may be a temperature of a housing of the terminal that is in direct contact with a user. A temperature sensor may be disposed in the terminal in advance, and the terminal temperature parameter is collected by using the temperature sensor.

The terminal status information includes one or more parameters used to reflect usage of the terminal. Optionally, the terminal status information further includes a charge and discharge status parameter and/or a usage status parameter. The charge and discharge status parameter is used to reflect whether the terminal is in a charge status or in a discharge status. The usage status parameter is used to reflect a usage status of the terminal, and a common usage status includes a call status, a camera usage status, an application program usage status, and the like. The charge and discharge status parameter and the usage status parameter may be obtained by using related man-machine interaction information.

Step 902: Obtain environment status information and/or user status information.

The environment status information includes one or more parameters used to reflect an environment in which the user is located. In an embodiment, the environment status information includes at least an environment temperature parameter and/or an environment humidity parameter. The environment status information may be obtained by using an environment sensor. The environment sensor is disposed in the terminal and/or a wearable device and/or a temperature control device. When the environment status information includes the environment temperature parameter, the environment sensor includes the temperature sensor. When the environment status information includes the environment humidity parameter, the environment sensor includes a humidity sensor.

The user status information includes one or more parameters used to reflect physiology and/or movement of the user. In an embodiment, the user status information includes at least one of a user body temperature parameter, a user electrocardiogram parameter, a user electroencephalogram parameter, or a user skin resistance parameter. The user status information may reflect a thermal perception of the user in different aspects, such as a body temperature, a heartbeat, and an emotion of the user. The user status information may be obtained by using a biosensor. The biosensor is disposed in the terminal and/or the wearable device, and the biosensor includes at least one of a body temperature sensor, an electrocardiogram sensor, an electroencephalogram sensor, or a skin resistance sensor.

Certainly, in another possible embodiment, the biosensor may further include a myoelectric sensor, a blood pressure sensor, and the like. Alternatively, the user status information may be further collected by combining a motion sensor such as a gravity sensor, a tri-axis accelerometer, or a gyroscope.

The various pieces of information related to a thermal perception of the user and in step 901 and step 902 may be obtained through collection by different devices in the implementation environment shown in FIG. 1. In a specific embodiment, the temperature sensor in the terminal collects the terminal temperature parameter, a temperature sensor in the temperature control device collects the environment temperature parameter, and the electrocardiogram sensor in the wearable device collects the user electrocardiogram parameter. Then, the devices send the various pieces of information related to the thermal perception of the user and obtained through collection to the terminal for integration. Correspondingly, the terminal obtains the various pieces of information related to the thermal perception of the user, processes and analyzes the obtained information by using the following steps, and then executes a proper thermal control policy.

Step 903: Determine, according to the terminal status information and either of or both of the environment status information and the user status information, a profile in which a user is.

The terminal may prestore a profile library, and the profile library includes multiple profiles. After obtaining the various pieces of information related to the thermal perception of the user, the terminal preprocesses the obtained information, and obtains a corresponding profile from the profile library through matching according to a processing result. In the profile, a scenario in which the user is actually located is simulated from different perspectives of a terminal status, an environment status, and a user status, and the thermal perception of the user is reflected.

When different profiles are obtained through classification, at least one classification condition may be set from the different perspectives of the terminal status, the environment status, and the user status. For example, for the terminal status, a classification condition used to distinguish a charge and discharge status of the terminal and a classification condition used to distinguish a usage status of the terminal may be set. For the environment status, a classification condition used to distinguish an environment temperature and a classification condition used to distinguish environment humidity may beset. For the user status, a classification condition used to distinguish a user body temperature status, a classification condition used to distinguish a user heartbeat status, a classification condition used to distinguish a user emotion status, and the like may be set.

In this embodiment, an example in which the obtained information includes the charge and discharge status parameter, the usage status parameter, and the user electrocardiogram parameter is used. The terminal separately preprocesses the foregoing parameters to obtain three classification conditions. Specifically, 1. A first classification condition is determined according to the charge and discharge status parameter.

The first classification condition is used to distinguish a charge and discharge status of the terminal. Optionally, the first classification condition is that the terminal is in a charge status or in a discharge status. When the terminal is in a charge status, heat emitting of the terminal is relatively obvious. The charge and discharge status of the terminal is used as a classification condition for distinguishing different profiles, which can more intuitively reflect a reason for generating heat by the terminal and a feature of a profile, so that a targeted thermal control policy is selected and executed in a subsequent process.

2. A second classification condition is determined according to the usage status parameter.

The second classification condition is used to distinguish a usage status of the terminal. Optionally, the second classification condition is that the terminal is in a call status, a camera usage status, or an application program usage status. The foregoing three usage statuses are three common usage statuses of the terminal. The camera usage status refers to that a camera is being used to perform photographing or image shooting. An application program in the application program usage status may be any application program installed in the terminal, and includes, but is not limited to, a browser, an email, an instant message service, word processing, keyboard virtualization, a window widget, encryption, digital right management, speech recognition, speech replication, locating, audio and video playback, and the like. The usage status of the terminal is used as a classification condition for distinguishing different profiles, which can more intuitively reflect a reason for generating heat by the terminal and a feature of a profile, so that a targeted thermal control policy is selected and executed in a subsequent process.

In addition, in this embodiment, only an example in which the usage status of the terminal is classified into the call status, the camera usage status, and the application program usage status is used. In another possible implementation manner, the usage status may be classified into different quantities of and different types of usage statuses according to an actual case, which is not specifically limited in this embodiment.

3. A third classification condition is determined according to the user electrocardiogram parameter.

The third classification condition is used to distinguish a user status of the terminal. The user status may be reflected in different aspects, such as a body temperature, a heartbeat, and an emotion of the user.

Using an example in which the user status information is the user electrocardiogram parameter, the following processing may be performed on the user electrocardiogram parameter to determine the third classification condition: time intervals between adjacent sinus heartbeats in different time periods are extracted according to the user electrocardiogram parameter; a change rate of a standard deviation is calculated according to the standard deviation of the time intervals in the different periods; and the third classification condition is determined according to a value relationship between the change rate of the standard deviation and a threshold of the change rate, where the third classification condition is that the change rate of the standard deviation is greater than the threshold of the change rate or the change rate of the standard deviation is less than the threshold of the change rate.

Specifically, it is assumed that the terminal obtains user electrocardiogram parameters within latest 10 minutes. First, time intervals between adjacent sinus heartbeats in a first time period including the first five minutes and time intervals between adjacent sinus heartbeats in a second time period including the last five minutes are detected from the user electrocardiogram parameters within the latest 10 minutes. Then, a standard deviation $x_1$ of the time intervals in the first time period and a standard deviation $x_2$ of the time intervals in the second time period are separately calculated. An example in which the standard deviation $x_1$ of the time intervals $\{t_1, t_2, \ldots, t_i, \ldots, t_n\}$ in the first time period is calculated is used, where $$x_1 = \sqrt{\frac{\sum_{i=1}^{n}(t_i - \bar{t})}{n}},$$

$n \geq 1$, and n is an integer. Then, a change rate $\varepsilon$ of the standard deviation is calculated, where $$\varepsilon = \frac{|x_1 - x_2|}{x_1}.$$

Finally, a value relationship between the change rate $\varepsilon$ of the standard deviation and a threshold $\varepsilon_0$ of the change rate is compared, where the threshold $\varepsilon_0$ of the change rate is a preset empirical value, for example, 0.1.

Alternatively, when the user status information is the user electroencephalogram parameter, the user electroencephalogram parameter may be processed and identified, and the third classification condition related to the emotion of the user is determined accordingly.

The user status is used as a classification condition for distinguishing different profiles, which can reflect the thermal perception of the user according to a user body temperature, a user heartbeat change, or a user emotion change, so that a thermal control policy is selected and executed in a subsequent process more accurately and more effectively.

With reference to the foregoing three classification conditions, in a specific example, the profile library may include 12 profiles shown in the following Table-1.

TABLE 1

| First classification condition | Second classification condition | Third classification condition | Profile V |
|---|---|---|---|
| Charge status | Call status | $\varepsilon > \varepsilon_0$ | Profile 1 |
| | | $\varepsilon < \varepsilon_0$ | Profile 2 |
| | Camera usage status | $\varepsilon > \varepsilon_0$ | Profile 3 |
| | | $\varepsilon < \varepsilon_0$ | Profile 4 |
| | Application program usage status | $\varepsilon > \varepsilon_0$ | Profile 5 |
| | | $\varepsilon < \varepsilon_0$ | Profile 6 |
| Discharge status | Call status | $\varepsilon > \varepsilon_0$ | Profile 7 |
| | | $\varepsilon < \varepsilon_0$ | Profile 8 |
| | Camera usage status | $\varepsilon > \varepsilon_0$ | Profile 9 |
| | | $\varepsilon < \varepsilon_0$ | Profile 10 |
| | Application program usage status | $\varepsilon > \varepsilon_0$ | Profile 11 |
| | | $\varepsilon < \varepsilon_0$ | Profile 12 |

After at least one classification condition is obtained, a profile conforming to the classification conditions is obtained from the profile library through matching. With reference to the foregoing Table-1, assuming that the first classification condition is the charge status, the second classification condition is the call status, and the third classification condition is $\varepsilon > \varepsilon_0$, a profile conforming to the three classification conditions is the profile 1.

A scenario in which the user is actually located is simulated from different perspectives of the terminal status, the environment status, and the user status by setting different profiles, the thermal perception of the user is learned, and a reason for affecting a thermal comfort level of the user is learned. For example, when the profile is the profile 1, it may be determined that the thermal comfort level of the user is affected due to heat caused by charging and calling of the terminal; heartbeats of the user change obviously, indicating that heat emitting of the terminal is also relatively obvious.

Step 904: Execute a thermal control policy corresponding to the profile, where the thermal control policy includes a terminal temperature control policy and/or an environment temperature control policy.

The terminal temperature control policy is used to adjust and control a temperature of the terminal. A local thermal comfort level of the user can be improved by adjusting and controlling the temperature of the terminal, that is, thermal comfort levels of a hand and skin of the user that are in direct contact with the terminal are improved, thereby avoiding thermalgesia generated in a process in which the user uses the terminal. The environment temperature control policy is used to adjust and control a temperature of an environment. An entire thermal comfort level of the user can be improved by adjusting and controlling the temperature of the environment, so that the user uses the terminal in a more appropriate environment.

The terminal temperature control policy is one or more of the following operations performed on the terminal 1. reducing luminance of a screen; 2. limiting a charging current; 3. cleaning a background progress; 4. limiting cores/a frequency of a processor; 5. stopping a data service; 6. power back-off; 7. disabling an image optimization function; 8. turning off a flash; 9. dropping a frame; 10. high temperature reminding; 11. turning off the screen.

Some terminal temperature control policies are briefly described below: The terminal temperature control policy having a sequence number of 5 refers to stopping services, such as webpage browsing, information sending and receiving, a video call, a network video, and a network game. The terminal temperature control policy having a sequence number of 6 refers to reducing transmit power of a radio frequency circuit used for communication. The terminal temperature control policy having a sequence number of 9 refers to reducing frequency of image switching in a video or game process.

In a possible embodiment, different terminal temperature control policies may be set in different profiles. With reference to the foregoing Table-1, for example, a terminal temperature control policy corresponding to the profile 1 may include the terminal temperature control policies having sequence numbers of 1, 2, 3, 4, 5, 10, and 11; for another example, a terminal temperature control policy corresponding to the profile 3 may include the terminal temperature control policies having the sequence numbers of 1, 2, 3, 4, 7, 8, 10, and 11.

In addition, the environment temperature control policy refers to adjusting and controlling, by using the temperature control device, a temperature of an environment in which the user is located. In a possible embodiment, the terminal may calculate an expected environment temperature according to the terminal temperature parameter and the profile, and then control the temperature control device to adjust and control an environment temperature to the expected environment temperature.

It should be noted that, step 901 to step 904 may be independently performed by the terminal in the implementation environment shown in FIG. 1, or may be independently performed by the temperature control device, the wearable device, or the server in the implementation environment shown in FIG. 1, or may be performed by two or more devices in the implementation environment shown in FIG. 1 in a cooperation manner. In this embodiment, only an example in which step 901 to step 904 are independently performed by the terminal in the implementation environment shown in FIG. 1 is used for description, which is not specifically limited.

To sum up, by means of the thermal control method provided in this embodiment, terminal status information including a terminal temperature parameter is obtained, environment status information and/or user status information are/is obtained, and a thermal control policy is then determined and executed according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

In addition, by means of the thermal control method provided in this embodiment, a scenario in which the user is actually located is further simulated from different perspectives of a terminal status, an environment status, and a user status by setting different profiles, the thermal perception of the user is learned, and a reason for affecting the thermal comfort level of the user is learned, which facilitates targeted selection of the thermal control policy, and improves efficiency and accuracy of thermal control.

In addition, by means of the thermal control method provided in this embodiment, a temperature of the terminal is further adjusted and controlled by using a terminal temperature control policy, which improves a local thermal comfort level of the user, so that performance of the terminal and the local thermal comfort level of the user are balanced. An environment temperature is further adjusted and controlled by using an environment temperature control policy, which further improves an entire thermal comfort level of the user.

A process of determining a terminal temperature control policy and a process of determining an environment temperature control policy are respectively described below by using two embodiments in FIG. 10 and FIG. 11. In the embodiment shown in FIG. 10, the process of determining a terminal temperature control policy is first described.

Figure 10:
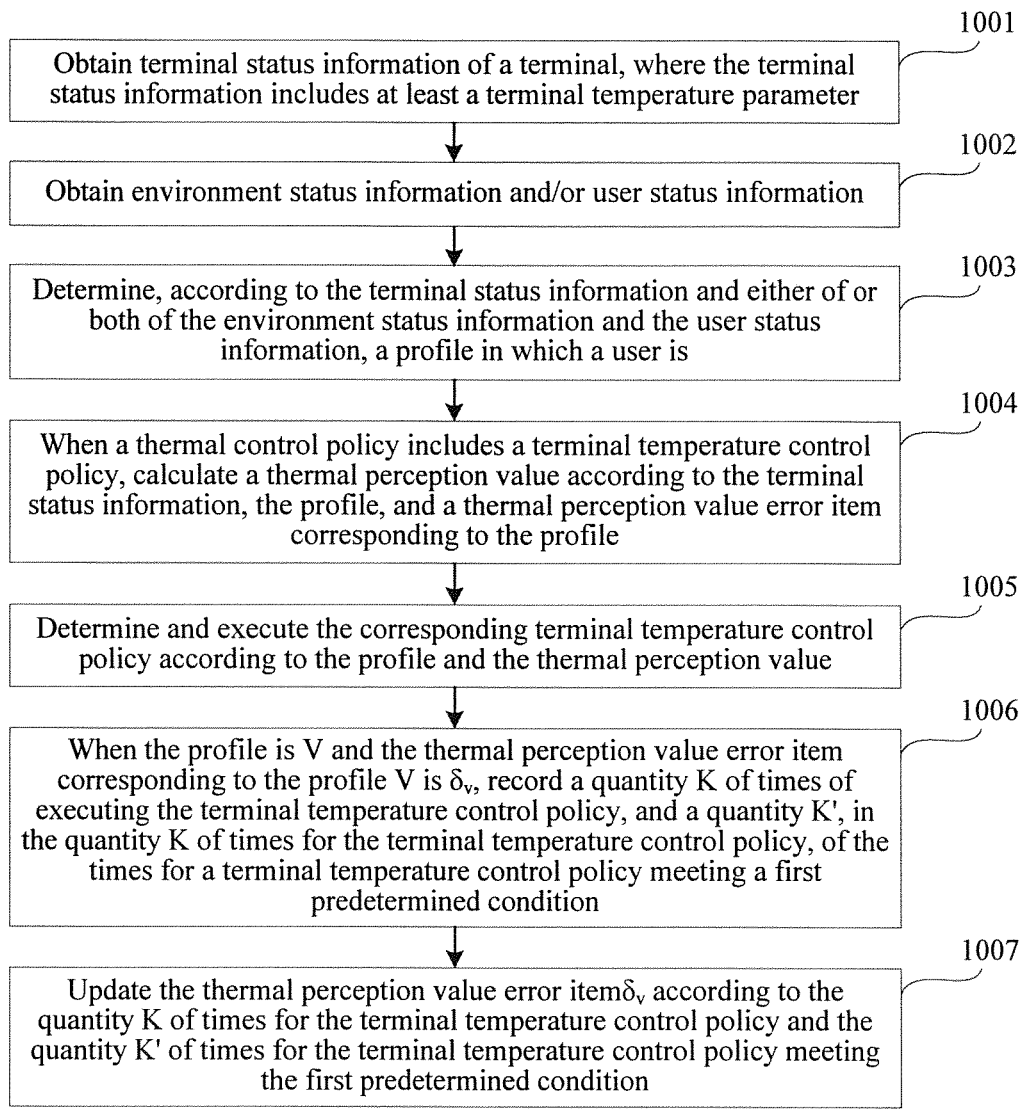
FIG. 10 is a method flowchart of a thermal control method according to still another embodiment of the present invention.

Referring to FIG. 10, FIG. 10 is a method flowchart of a thermal control method according to still another embodiment of the present invention. In this embodiment, an example in which the thermal control method is applied to the implementation environment shown in FIG. 1 is used for description. The thermal control method may include the following several steps:

Step 1001: Obtain terminal status information of a terminal, where the terminal status information includes at least a terminal temperature parameter.

Step 1002: Obtain environment status information and/or user status information.

The environment status information includes at least an environment temperature parameter and/or an environment humidity parameter. The user status information includes at least one of a user body temperature parameter, a user electrocardiogram parameter, a user electroencephalogram parameter, or a user skin resistance parameter.

Step 1003: Determine, according to the terminal status information and either of or both of the environment status information and the user status information, a profile in which a user is.

Step 1001 to step 1003 are the same as or similar to step 901 to step 903 in the embodiment shown in FIG. 9. For details, refer to the descriptions in the embodiment shown in FIG. 9, and details are not described in this embodiment again. After the profile is determined according to the various pieces of the obtained information related to a thermal perception of a user, a corresponding terminal temperature control policy is determined according to step 1004 and step 1005.

Step 1004: When a thermal control policy includes a terminal temperature control policy, calculate a thermal perception value according to the terminal status information, the profile, and a thermal perception value error item corresponding to the profile.

The thermal perception value error item is used to reflect a thermal perception difference between different users in the profile. For each profile, an initial value of the thermal perception value error item corresponding to the profile may be preset to 0. The thermal perception value error item may be dynamically adjusted in a subsequent process according to a reaction of the user to the terminal temperature control policy, to meet a personalized thermal comfort requirement of the user.

In a possible implementation manner, assuming that the profile determined in step 1003 is V, the thermal perception value T may be calculated according to a first user-defined algorithm $g(\Omega)$:

$$T=g(\Omega)+\delta_v,$$

$g(\Omega)$ denotes the first user-defined algorithm that is formulated according to the terminal status information and the profile V; $\delta_v$ denotes the thermal perception value error item corresponding to the profile V, and the thermal perception value error item $\delta_v$ is used to reflect a thermal perception difference between different users in the profile V.

In addition, according to the different obtained information, the first user-defined algorithm $g(\Omega)$ may include the following several possible cases:

1. When the obtained information includes a terminal temperature parameter x and an environment temperature parameter y, the first user-defined algorithm $g(\Omega)$ is:

$$g(\Omega)=g(x,y,m_v),$$

where the terminal temperature parameter x is in a positive correlation relationship with the thermal perception value T; the environment temperature parameter y is in a positive correlation relationship with the thermal perception value T; $m_v$ denotes a profile factor corresponding to the profile V, and the profile factor $m_v$ is in a positive correlation relationship with the thermal perception value T.

The profile factor $m_v$ corresponding to the profile V is a preset empirical value. Different profiles correspond to different profile factors. For example, a profile factor $m_1$ corresponding to a profile 1 may be preset to 1.1.

In a specific example, the first user-defined algorithm $g(\Omega)$ is:

$$g(\Omega)=g(x,y,m_v)=x\times\phi(y)\times m_v,$$

where $\phi(y)$ denotes a function of impact of the environment temperature parameter y on the thermal perception value T; when $y_{min} \leq y \leq y_{max}$, $$\phi(y) = 1 + \ln\left(\frac{y}{y_0}\right);$$

when $y > y_{max}$, $$\phi(y) = 1 + \ln\left(\frac{y_{max}}{y_0}\right);$$

when $y < y_{min}$, $$\phi(y) = 1 + \ln\left(\frac{y_{min}}{y_0}\right),$$

where $y_0$ denotes a reference environment temperature, $y_{max}$ denotes an upper limit value of an adjustable and controllable range of an environment temperature, and $y_{min}$ denotes a lower limit value of the adjustable and controllable range of the environment temperature. $y_0$, $y_{max}$, and $y_{min}$ may all be preset according to an actual case. For example, $y_0=26°$ C., $y_{max}=36°$ C., and $y_{min}=16°$ C.

As can be seen from the first user-defined algorithm $g(\Omega)$, the terminal temperature parameter x is in a positive correlation relationship with the thermal perception value T; when $y_{min} \leq y \leq y_{max}$, the environment temperature parameter y is in a positive correlation relationship with the thermal perception value T; different profiles V affect a value of the thermal perception value T by using profile factors $m_v$ corresponding to the profiles V.

2. When the obtained information includes a terminal temperature parameter x, an environment temperature parameter y, and an environment humidity parameter z, the first user-defined algorithm $g(\Omega)$ is:

$$g(\Omega)=g(x,y,z,m_v),$$

where the terminal temperature parameter x is in a positive correlation relationship with the thermal perception value T; the environment temperature parameter y is in a positive correlation relationship with the thermal perception value T; the environment humidity parameter z is in a positive correlation relationship with the thermal perception value T; a profile factor $m_v$ is in a positive correlation relationship with the thermal perception value T.

In a specific example, the first user-defined algorithm $g(\Omega)$ is:

$$g(\Omega)=g(x,y,z,m_v)=x\phi(y)\times m_v+\varphi(z),$$

where $\phi(y)$ denotes a function of impact of the environment temperature parameter y on the thermal perception value T; when $y_{min} \leq y \leq y_{max}$, $$\phi(y) = 1 + \ln\left(\frac{y}{y_0}\right);$$

when $y > y_{max}$, $$\phi(y) = 1 + \ln\left(\frac{y_{max}}{y_0}\right);$$

when $y < y_{min}$, $$\phi(y) = 1 + \ln\left(\frac{y_{min}}{y_0}\right),$$

where $y_0$ denotes a reference environment temperature, $y_{max}$ denotes an upper limit value of an adjustable and controllable range of an environment temperature, and $y_{min}$ denotes a lower limit value of the adjustable and controllable range of the environment temperature. $\varphi(z)$ denotes a function of impact of the environment humidity parameter z on the thermal perception value T; when $z_{min} \leq z \leq z_{max}$, $\varphi(z)=(z-z_0) \times \beta$; when $z > z_{max}$, $\varphi(z)=(z_{max}-z_0) \times \beta$; when $z < z_{min}$, $\varphi(z)=(z_{min}-z_0) \times \beta$, where $z_0$ denotes reference environment humidity, $z_{max}$ denotes an upper limit value of environment humidity, $z_{min}$ denotes a lower limit value of the environment humidity, and $\beta$ is a proportionality coefficient. The proportionality coefficient $\beta$ is used to reflect a proportional relationship between a relative humidity change and a thermal perception change. For example, when $\beta=3$, it indicates that a thermal perception change caused by a relative humidity change of 10% is 0.3. $z_0$, $z_{max}$, $z_{min}$, and $\beta$ may all be preset according to an actual case. For example, $z_0=50\%$, $z_{max}=70\%$, $z_{min}=30\%$, and $\beta=3$.

As can be seen from the first user-defined algorithm $g(\Omega)$, the terminal temperature parameter x is in a positive correlation relationship with the thermal perception value T; when $y_{min} \leq y \leq y_{max}$, the environment temperature parameter y is in a positive correlation relationship with the thermal perception value T; when $z_{min} \leq z \leq z_{max}$, the environment humidity parameter z is in a positive correlation relationship with the thermal perception value T; different profiles V affect a value of the thermal perception value T by using profile factors $m_v$ corresponding to the profiles V.

3. When the obtained information includes a terminal temperature parameter x, an environment temperature parameter y, and a user body temperature parameter w, the first user-defined algorithm $g(\Omega)$ is:

$$g(\Omega)=g(x,y,w,m_v),$$

where the terminal temperature parameter x is in a positive correlation relationship with the thermal perception value T; the environment temperature parameter y is in a positive correlation relationship with the thermal perception value T; the user body temperature parameter w is in a positive correlation relationship with the thermal perception value T; the profile factor $m_v$ is in a positive correlation relationship with the thermal perception value T.

In a specific example, the first user-defined algorithm $g(\Omega)$ is:

$$g(\Omega)=g(x,y,w,m_v)=x \times \varphi(y) \times m_v \times \tau(w),$$

where $\varphi(y)$ denotes a function of impact of the environment temperature parameter y on the thermal perception value T; when $y_{min} \leq y \leq y_{max}$, $$\phi(y) = 1 + \ln\left(\frac{y}{y_0}\right);$$

when $y > y_{max}$, $$\phi(y) = 1 + \ln\left(\frac{y_{max}}{y_0}\right);$$

when $y < y_{min}$, $$\phi(y) = 1 + \ln\left(\frac{y_{min}}{y_0}\right),$$

where $y_0$ denotes a reference environment temperature, $y_{max}$ denotes an upper limit value of an adjustable and controllable range of an environment temperature, and $y_{min}$ denotes a lower limit value of the adjustable and controllable range of the environment temperature. $\tau(w)$ denotes a function of impact of the user body temperature parameter w on the thermal perception value T; when $w_{min} \leq w \leq w_{max}$, $\tau(w)=1$; when $w > w_{max}$, $\tau(w)=1+e^{w-w_{max}}$; when $w < w_{min}$, $\tau(w)=1+e^{w_{min}-w}$, wheren $w_{max}$ denotes an upper limit value of a body temperature of a user in a thermal comfort state, and $w_{min}$ denotes a lower limit value of the body temperature of the user in a thermal comfort state. $w_{max}$ and $w_{min}$ may both be preset according to an actual case. For example, $w_{max}=33.7°$ C., and $w_{min}=32.6°$ C. It should be noted that the body temperature of the user refers to a skin temperature of the user.

As can be seen from the first user-defined algorithm $g(\Omega)$, the terminal temperature parameter x is in a positive correlation relationship with the thermal perception value T; when $y_{min} \leq y \leq y_{max}$, the environment temperature parameter y is in a positive correlation relationship with the thermal perception value T; when $w_{min} \leq w \leq w_{max}$, the user body temperature parameter w is in a positive correlation relationship with the thermal perception value T; different profiles V affect a value of the thermal perception value T by using different profile factors $m_v$ corresponding to the profiles V.

It should be noted that in this embodiment, only the foregoing three first user-defined algorithms are used as examples for description. In an actual application, different algorithms may be preset according to different obtained information, to calculate the thermal perception value, which is not specifically limited in this embodiment.

Step 1005: Determine and execute the corresponding terminal temperature control policy according to the profile and the thermal perception value.

After the thermal perception value T is calculated, a terminal temperature control policy corresponding to the profile V and the thermal perception value T is determined and executed. The terminal temperature control policy is used to adjust and control a terminal temperature of the terminal. A local thermal comfort level of the user can be improved by adjusting and controlling the temperature of the terminal, that is, thermal comfort levels of a hand and skin of the user that are in direct contact with the terminal are improved, thereby avoiding thermalgesia generated in a process in which the user uses the terminal.

The terminal temperature control policy is one or more of the following operations performed on the terminal: 1. reducing luminance of a screen; 2. limiting a charging current; 3. cleaning a background progress; 4. limiting cores/a frequency of a processor; 5. stopping a data service; 6. power back-off; 7. disabling an image optimization function; 8. turning off a flash; 9. dropping a frame; 10. high temperature reminding; 11. turning off the screen.

In a possible implementation manner, assuming that the profile determined in step 1003 is V, this step may include the following several substeps:

first, obtaining a terminal temperature control correspondence corresponding to the profile V; and second, selecting, according to the terminal temperature control correspondence, a terminal temperature control policy corresponding to a range of the thermal perception value.

Different profiles correspond to different terminal temperature control correspondences. For each group of terminal temperature control correspondences, the terminal temperature control correspondences include correspondences between ranges of different thermal perception values and different terminal temperature control policies.

For example, a terminal temperature control correspondence corresponding to the profile 1 may be shown in the following Table-2.

TABLE 2

| | Profile 1 | | | |
|---|---|---|---|---|
| | Thermal perception value T | | | |
| | 46 ≤ T < 48 | 48 ≤ T < 50 | 50 ≤ T < 52 | T ≥ 52 |
| Terminal temperature control policy | 1 | 2 and 3 | 4 and 5 | 10 and 11 |

It should be noted that in this embodiment, only the foregoing several terminal temperature control policies are used as examples for description, and in another possible embodiment, another different terminal temperature control policy may be further formulated according to an actual case.

In addition, to meet a personalized thermal comfort requirement of the user, by means of the thermal control method provided in this embodiment, the thermal perception value error item may be further updated in real time, regularly, or irregularly according to the reaction of the user to the terminal temperature control policy, so that the thermal perception value error item can more accurately reflect a thermal perception difference between different users in a corresponding profile. Specifically, the thermal control method provided in this embodiment may further include the following step 1006 and step 1007.

Step 1006: When the profile is V and the thermal perception value error item corresponding to the profile V is $\delta_v$, record a quantity K of times of executing the terminal temperature control policy, and a quantity K', in the quantity K of times for the terminal temperature control policy, of the times for a terminal temperature control policy meeting a first predetermined condition.

The first predetermined condition refers to that the user generates a first predetermined reaction within first predetermined duration after the terminal temperature control policy takes effect. The first predetermined duration is a preset empirical value, for example, 3 minutes. The first predetermined reaction includes, but is not limited to, one or more of the following cases: 1. the user changes a manner for holding the terminal; 2. the user stops using the terminal; or 3. amplification of a heart rate of the user exceeds a preset threshold of heart rate amplification.

Within a period of time after the teLittinal temperature control policy takes effect, when the user makes the foregoing reaction, it indicates that a thermal perception of the user is relatively obvious. In this case, the value of the thermal perception value error item $\delta_v$ may be appropriately adjusted, so that the thermal perception value error item $\delta_v$ can more accurately reflect the thermal perception of the user.

Step 1007: Update the thermal perception value error item $\delta_v$ according to the quantity K of times for the terminal temperature control policy and the quantity K' of times for the terminal temperature control policy meeting the first predetermined condition.

In a possible implementation manner, the thermal perception value error item $\delta_v$ may be updated by using the following formula:

$$\delta'_v = \delta_v - \frac{K' \times \Delta T}{K},$$

where K denotes the quantity of times for the terminal temperature control policy; IC denotes the quantity of times for the terminal temperature control policy meeting the first predetermined condition; $\delta_v'$ denotes an updated thermal perception value error item; $\delta_v$ denotes a thermal perception value error item before update; δT is a constant. δT is a preset empirical value. For example, δT=0.5° C. A larger value of K' indicates that the user is more sensitive to heat emitting of the terminal, and change amplification of the thermal perception value error item $\delta_v$ corresponding to K' is larger; in contrast, a smaller value of K' indicates that the user is less sensitive to heat emitting of the terminal, and change amplification of the thermal perception value error item $\delta_v$ corresponding to K' is smaller.

A usage habit of the user is learned according to the reaction of the user to the terminal temperature control policy, and the value of the thermal perception value error item $\delta_v$ is dynamically adjusted according to the usage habit of the user, so that the thermal perception value error item $\delta_v$ can more accurately reflect a thermal perception difference of different users in a corresponding profile V, thereby meeting a personalized thermal comfort requirement of the user.

It should be noted that, step 1001 to step 1007 may be independently performed by the terminal in the implementation environment shown in FIG. 1, or may be independently performed by the temperature control device, the wearable device, or the server in the implementation environment shown in FIG. 1, or may be performed by two or more devices in the implementation environment shown in FIG. 1 in a cooperation manner. For example, step 1001 to step 1006 may be performed by the terminal. After recording the foregoing parameters K and K', the terminal sends the parameters K and K' to the server in real time, regularly, or irregularly. The server performs step 1007 to update the thermal perception value error item $\delta_v$, and feeds back an updated thermal perception value error item to the terminal.

To sum up, by means of the thermal control method provided in this embodiment, terminal status information including a terminal temperature parameter is obtained, environment status information and/or user status information are/is obtained, and a thermal control policy is then determined and executed according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the user.

In addition, by means of the thermal control method provided in this embodiment, a thermal perception value error item is further updated in real time, regularly, or irregularly according to a reaction of the user to a terminal temperature control policy, so that the thermal perception value error item can more accurately reflect a thermal perception difference between different users in a corresponding profile, thereby meeting a personalized thermal comfort requirement of the user.

In the embodiment shown in FIG. 10, the process of determining a terminal temperature control policy is described. The process of determining an environment temperature control policy is described below by using the embodiment shown in FIG. 11.

Figure 11:
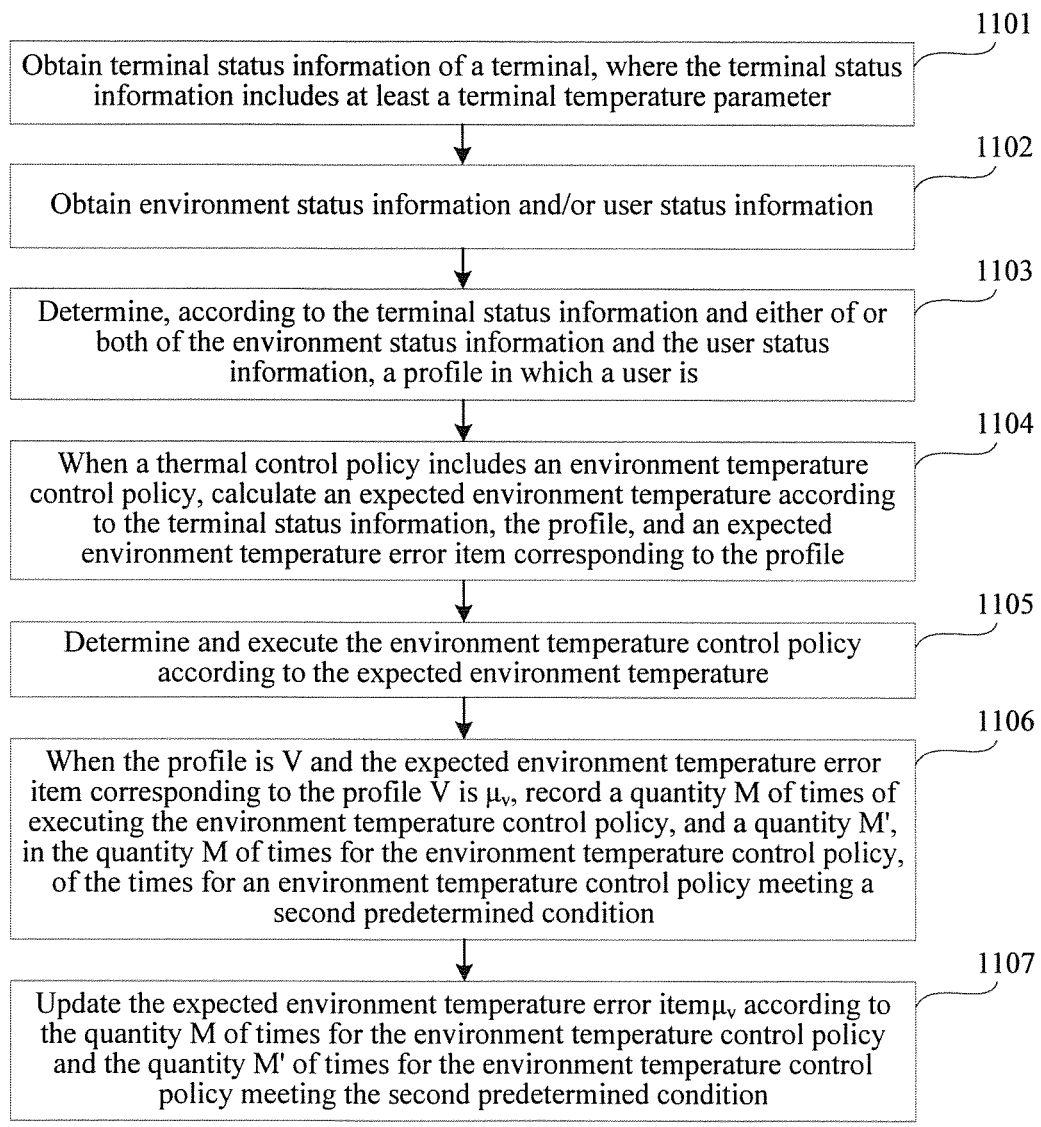
FIG. 11 is a method flowchart of a thermal control method according to yet another embodiment of the present invention.

Referring to FIG. 11, FIG. 11 is a method flowchart of a thermal control method according to yet another embodiment of the present invention. In this embodiment, an example in which the thermal control method is applied to the implementation environment shown in FIG. 1 is used for description. The thermal control method may include the following several steps:

Step 1101: Obtain terminal status information of a terminal, where the terminal status information includes at least a terminal temperature parameter.

Step 1102: Obtain environment status information and/or user status information.

The environment status information includes at least an environment temperature parameter and/or an environment humidity parameter. The user status information includes at least one of a user body temperature parameter, a user electrocardiogram parameter, a user electroencephalogram parameter, or a user skin resistance parameter.

Step 1103: Determine, according to the terminal status information and either of or both of the environment status information and the user status information, a profile in which a user is.

Step 1101 to step 1103 are the same as or similar to step 901 to step 903 in the embodiment shown in FIG. 9. For details, refer to the descriptions in the embodiment shown in FIG. 9, and details are not described in this embodiment again. After the profile is determined according to the various pieces of the obtained information related to a thermal perception of a user, a corresponding environment temperature control policy is determined according to step 1104 and step 1105.

Step 1104: When a thermal control policy includes an environment temperature control policy, calculate an expected environment temperature according to the terminal status information, the profile, and an expected environment temperature error item corresponding to the profile.

Similar to a thermal perception value error item, for each profile, an initial value of the expected environment temperature error item corresponding to the profile may be preset to 0. The expected environment temperature error item may be dynamically adjusted in a subsequent process according to a reaction of the user to the environment temperature control policy, to meet a personalized thermal comfort requirement of the user.

In a possible implementation manner, assuming that the profile determined in step 1103 is V, the expected environment temperature E may be calculated according to a second user-defined algorithm h(Ω):

$$E = h(\Omega) + \mu_v, \text{ where}$$

h(Ω) denotes the second user-defined algorithm that is formulated according to the terminal status information and the profile V; $\mu_v$ denotes the expected environment temperature error item corresponding to the profile V, and the expected environment temperature error item $\mu_v$ is used to reflect an environment temperature perception difference between different users in the profile V.

In addition, according to the different obtained information, the second user-defined algorithm h(Ω) also has multiple calculation manners. In a possible calculation manner, assuming that the profile determined in step 1103 is V, the second user-defined algorithm h(Ω) is:

$$h(\Omega) = h(x, m_v),$$

where a terminal temperature parameter x is in a positive correlation relationship with the expected environment temperature E; $m_v$ denotes a profile factor corresponding to the profile V, and the profile factor $m_v$ is in a positive correlation relationship with the expected environment temperature E. The profile factor $m_v$ corresponding to the profile V is a preset empirical value. Different profiles correspond to different profile factors. For example, a profile factor $m_1$ corresponding to the profile 1 may be preset to 1.1.

In addition, before step 1104 is performed, the following steps may be further performed:

1. Determine whether a product of the terminal temperature parameter and the profile factor $m_v$ corresponding to the profile V is greater than a predetermined threshold.

2. If the product is greater than the predetermined threshold, perform step 1104.

3. If the product is less than the predetermined threshold, use a preset reference environment temperature as the expected environment temperature E.

An environment temperature may be adjusted and controlled within a more proper range through the determining in the foregoing steps, and the environment temperature is not adjusted and controlled to be excessively high or excessively low due to excessively great impact of the terminal temperature parameter, which can maintain the environment temperature within a range in which the user feels comfortable.

In a specific example, the expected environment temperature E may be determined in the following manner:

first, the product $x \times m_v$ of the terminal temperature parameter x and the profile factor $m_v$ corresponding to the profile V is compared with the predetermined threshold X; if $x \times m_v \geq X$, the expected environment temperature E is calculated by using the following formula, where $$E = \max\left(y_0 - \alpha \times e^{\frac{x \times m_v - X}{X}} + \mu_v, y_{min}\right);$$

if $x \times m_v < X$, a preset reference environment temperature $y_0$ is used as the expected environment temperature E, where $y_0$ denotes the reference environment temperature; $y_{min}$ denotes a lower limit value of an adjustable and controllable range of an environment temperature; denotes the expected environment temperature error item corresponding to the profile V; α is a constant and α>0. $y_0$, $y_{min}$, and α may all be preset according to an actual case. For example, $y_0=26°$ C., $y_{min}=16°$ C., and α=2.

Step 1105: Determine and execute the environment temperature control policy according to the expected environment temperature.

The environment temperature control policy is used to adjust and control a temperature of an environment. For an adjustment and control objective of the environment temperature, the calculated expected environment temperature may be used as a reference. An entire thermal comfort level of the user can be improved by adjusting and controlling the temperature of the environment, so that the user uses the terminal in a more appropriate environment.

For example, after obtaining the expected environment temperature through calculation, the terminal sends the expected environment temperature or a control instruction corresponding to the expected environment temperature to a temperature control device in a wireless manner. Correspondingly, after receiving the information sent by the terminal, the temperature control device adjusts and controls the environment temperature to the expected environment temperature according to the received information.

In addition, to meet a personalized thermal comfort requirement of the user, by means of the thermal control method provided in this embodiment, the expected environment temperature error item may be further updated in real time, regularly, or irregularly according to the reaction of the user to the environment temperature control policy, so that the expected environment temperature error item can more accurately reflect an environment temperature perception difference between different users in a corresponding profile. Specifically, the thermal control method provided in this embodiment may further include the following step 1006 and step 1007.

Step 1106: When the profile is V and the expected environment temperature error item corresponding to the profile V is $\mu_v$, record a quantity M of times of executing the environment temperature control policy, and a quantity M', in the quantity M of times for the environment temperature control policy, of the times for an environment temperature control policy meeting a second predetermined condition.

The second predetermined condition refers to that the user generates a second predetermined reaction within second predetermined duration after the environment temperature control policy takes effect. For example, the second predetermined reaction is that the user manually adjusts and controls the environment temperature again. The second predetermined duration is a preset empirical value, for example, 5 minutes.

Within a period of time after the environment temperature control policy takes effect, when the second predetermined reaction is generated, it indicates that the user is unsatisfied with the environment temperature obtained after the user previously adjusts and controls the expected environment temperature automatically. In this case, a value of the expected environment temperature error item $\mu_v$ may be appropriately adjusted, so that the expected environment temperature error item $\mu_v$ can more accurately reflect a requirement of the user on the environment temperature; therefore, the expected environment temperature obtained through calculation in a subsequent process better confoLms to a personal requirement of the user.

Step 1107: Update the expected environment temperature error item $\mu_v$ according to the quantity M of times for the environment temperature control policy and the quantity M' of times for the environment temperature control policy meeting the second predetermined condition.

In a specific example, when the second predetermined reaction is that the user manually adjusts and controls the environment temperature again, this step may include the following two substeps:

first, for a environment temperature control policy that meets the second predetermined condition each time, recording an expected environment temperature corresponding to this manual adjustment and control and an adjusted and controlled environment temperature corresponding to this manual adjustment and control; and second, updating the expected environment temperature error item $\mu_v$ by using the following formula:

$$\mu_v' = \mu_v + \frac{1}{M}\sum_{i=1}^{M'}(E_i - E_i'),$$

where $\mu_v'$ denotes the updated expected environment temperature error item; $\mu_v$ denotes the expected environment temperature error item before update; $E_i$ denotes an expected environment temperature corresponding to an $i^{th}$ manual adjustment and control; $E_i'$ denotes an adjusted and controlled environment temperature corresponding to the $i^{th}$ manual adjustment and control, where i∈[1, M'], and i is an integer.

A usage habit of the user is learned according to the reaction of the user to the environment temperature control policy, and the value of the expected environment temperature error item $\mu_v$ is dynamically adjusted according to the usage habit of the user, so that the expected environment temperature error item $\mu_v$ can more accurately reflect an environment temperature perception difference of different users in a corresponding profile V, thereby meeting a personalized thermal comfort requirement of the user.

It should be noted that, step 1101 to step 1107 may be independently performed by the terminal in the implementation environment shown in FIG. 1, or may be independently performed by the temperature control device, the wearable device, or the server in the implementation environment shown in FIG. 1, or may be performed by two or more devices in the implementation environment shown in FIG. 1 in a cooperation manner. For example, step 1101 to step 1104 are performed by the terminal, step 1105 is performed by the terminal and the temperature control device in a cooperation manner, and step 1106 and the step 1107 are performed by the terminal and the server in a cooperation manner. In an actual application, different steps may be allocated to and executed by different devices according to a data storage capability and a data processing capability of each device, which is not specifically limited in this embodiment.

To sum up, by means of the thermal control method provided in this embodiment, terminal status information including a terminal temperature parameter is obtained, environment status information and/or user status information are/is obtained, and a thermal control policy is then determined and executed according to the obtained information related to a thermal perception of a user, so that a problem that heat generated by an operating terminal affects a thermal comfort level of the user is resolved; and an effective thermal control policy is executed with reference to various pieces of obtained information related to the thermal perception of the user, thereby reducing impact of the heat generated by the operating terminal on the user, and improving the thermal comfort level of the use.

In addition, by means of the thermal control method provided in this embodiment, an expected environment temperature error item is further updated in real time, regularly, or irregularly according to a reaction of the user to an environment temperature control policy, so that the expected environment temperature error item can more accurately reflect an environment temperature perception difference between different users in a corresponding profile, thereby meeting a personalized thermal comfort requirement of the user.

It should be further noted that, the process of determining a terminal temperature control policy and the process of determining an environment temperature control policy are respectively described in the embodiments shown in FIG. 10 and FIG. 11 by using examples. In an actual application, the terminal temperature control policy may be independently executed, or the environment temperature control policy may be independently executed, or both the terminal temperature control policy and the environment temperature control policy are executed, which is not specifically limited in this embodiment.

It should be understood that, except exception cases clearly supported in the context, "a" ("a", "an", and "the") in a singular form used in the specification is intended to also include a plural form. It should be further understood that, "and/or" used in the specification refers to including any and all possible combinations of one or more items that are associatively listed.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A thermal control apparatus, comprising:
a bus;
a processor coupled to the bus; and
memory coupled to the processor, wherein the memory comprises instructions that, when executed by the processor, cause the processor to:
obtain terminal status information of a terminal, wherein the terminal status information comprises at least a terminal temperature parameter;
obtain environment status information and/or user status information, wherein the environment status information comprises at least an environment temperature parameter and/or an environment humidity parameter, and the user status information comprises at least one of a user body temperature parameter, a user electrocardiogram parameter, a user electroencephalogram parameter, or a user skin resistance parameter;
determine a thermal control policy according to the terminal status information and at least one of the environment status information and the user status information, wherein the thermal control policy comprises a terminal temperature control policy and/or an environment temperature control policy; determine, according to the terminal status information and at least one of the environment status information and the user status information, a profile which the user is in; and
execute the thermal control policy according to the profile.

2. The apparatus according to claim 1, wherein the terminal status information further comprises a charge and discharge status parameter and/or a usage status parameter.

3. The apparatus according to claim 1, wherein
the environment status information is obtained by using an environment sensor, wherein the environment sensor is disposed in the terminal and/or a wearable device and/or a temperature control device, and the environment sensor comprises at least a temperature sensor and/or a humidity sensor; and/or
the user status information is obtained by using a biosensor, wherein the biosensor is disposed in the terminal and/or the wearable device, and the biosensor comprises at least one of a body temperature sensor, an electrocardiogram sensor, an electroencephalogram sensor, or a skin resistance sensor.

4. The apparatus according to claim 1, wherein the memory further comprises instructions that, when executed by the processor, cause the processor to:
when the thermal control policy comprises the terminal temperature control policy, calculate a thermal perception value according to the terminal status information, the profile, and a thermal perception value error item corresponding to the profile, wherein the thermal perception value error item reflects a thermal perception difference between different users in the profile; and, wherein
the determination and execution of the terminal temperature control policy is further according to the thermal perception value.

5. The apparatus according to claim 4, wherein the memory further comprises instructions that, when executed by the processor, cause the processor to:
when the profile is V and the thermal perception value error item corresponding to the profile V is $\delta_v$, record a quantity K of times of executing the terminal temperature control policy, and a quantity K', in the quantity K of times for the terminal temperature control policy, of times for a terminal temperature control policy meeting a first predetermined condition, wherein the first predetermined condition indicates that the user generates a first predetermined reaction within a first predetermined duration after the terminal temperature control policy takes effect; and
update the thermal perception value error item $\delta_v$ according to the quantity K of times for the terminal temperature control policy and the quantity K' of times for the terminal temperature control policy meeting the first predetermined condition.

6. A thermal control method, comprising:
obtaining terminal status information of a terminal, wherein the terminal status information comprises at least a terminal temperature parameter;
obtaining environment status information and/or user status information, wherein the environment status information comprises at least an environment temperature parameter and/or an environment humidity parameter, and the user status information comprises at least one of a user body temperature parameter, a user electrocardiogram parameter, a user electroencephalogram parameter, or a user skin resistance parameter;
determining and executing a thermal control policy according to the terminal status information and either of or both of the environment status information and the user status information, wherein the thermal control policy comprises a terminal temperature control policy and/or an environment temperature control policy;
determining, according to the terminal status information and at least one of the environment status information and the user status information, a profile which the user is in; and
executing the thermal control policy according to the profile.

7. The method according to claim 6, wherein the terminal status information further comprises a charge and discharge status parameter and/or a usage status parameter.

8. The method according to claim 6, wherein
the environment status information is obtained by using an environment sensor, wherein the environment sensor is disposed in the terminal and/or a wearable device and/or a temperature control device, and the environment sensor comprises at least a temperature sensor and/or a humidity sensor; and/or the user status information is obtained by using a biosensor, wherein the biosensor is disposed in the terminal and/or the wearable device, and the biosensor comprises at least one of a body temperature sensor, an electrocardiogram sensor, an electroencephalogram sensor, or a skin resistance sensor.

9. The method according to claim 8, wherein executing the thermal control policy according to the profile comprises:

when the thermal control policy comprises the terminal temperature control policy, calculating a thermal perception value according to the terminal status information, the profile, and a thermal perception value error item corresponding to the profile, wherein the thermal perception value error item reflects a thermal perception difference between different users in the profile; and, wherein the determining and executing of the terminal temperature control policy is further according to the thermal perception value.

10. The method according to claim 9, further comprising:

when the profile is V and the thermal perception value error item corresponding to the profile V is $\delta_v$, recording a quantity K of times of executing the terminal temperature control policy, and a quantity K', in the quantity K of times for the terminal temperature control policy, of times for a terminal temperature control policy meeting a first predetermined condition, wherein the first predetermined condition indicates that the user generates a first predetermined reaction within a first predetermined duration after the terminal temperature control policy takes effect; and updating the thermal perception value error item $\delta_v$ according to the quantity K of times for the terminal temperature control policy and the quantity K' of times for the terminal temperature control policy meeting the first predetermined condition.

* * * * *